(12) United States Patent
Yanagita

(10) Patent No.: US 9,369,699 B2
(45) Date of Patent: Jun. 14, 2016

(54) STEREOSCOPIC IMAGE DISPLAY DEVICE, STEREOSCOPIC IMAGING DEVICE, AND METHODS

(71) Applicant: FUJIFILM Corporation, Minato-ku, Tokyo (JP)

(72) Inventor: Satoshi Yanagita, Saitama (JP)

(73) Assignee: FUJIFILM Corporation, Tokyo (JP)

(*) Notice: Subject to any disclaimer, the term of this patent is extended or adjusted under 35 U.S.C. 154(b) by 744 days.

(21) Appl. No.: 13/709,730

(22) Filed: Dec. 10, 2012

(65) Prior Publication Data
US 2013/0093857 A1    Apr. 18, 2013

Related U.S. Application Data

(63) Continuation of application No. PCT/JP2011/003275, filed on Jun. 9, 2011.

(30) Foreign Application Priority Data

Jun. 11, 2010    (JP) ................................ 2010-133545

(51) Int. Cl.
*H04N 13/04*    (2006.01)
*H04N 13/00*    (2006.01)
(Continued)

(52) U.S. Cl.
CPC ............ *H04N 13/0402* (2013.01); *G03B 35/10* (2013.01); *G03B 35/18* (2013.01); (Continued)

(58) Field of Classification Search
CPC .... G03B 35/10; G03B 35/18; H04N 13/0022; H04N 13/0055; H04N 13/0066; H04N 13/0203; H04N 13/0402

USPC .......................................................... 348/47
See application file for complete search history.

(56) References Cited

U.S. PATENT DOCUMENTS

| 6,549,650 B1 | 4/2003 | Ishikawa et al. |
| 2005/0089212 A1* | 4/2005 | Mashitani et al. ............ 382/154 |

(Continued)

FOREIGN PATENT DOCUMENTS

| CN | 101651842 A | 2/2010 |
| JP | 10-90814 A | 4/1998 |

(Continued)

OTHER PUBLICATIONS

International Search Report for PCT/JP2011/003275 dated Aug. 23, 2011.

(Continued)

*Primary Examiner* — Anner Holder
(74) *Attorney, Agent, or Firm* — Sughrue Mion, PLLC

(57) ABSTRACT

A stereoscopic image display device that is capable of reading out and setting a stereoscopic effect control value suitable for a monitor size of a display monitor used to display an image is disclosed. A stereoscopic image for stereoscopically displaying an image is generated based on a multi-viewpoint image, and the stereoscopic image is displayed on a display monitor capable of stereoscopic display. At this time, a stereoscopic effect of the stereoscopic image displayed on the display monitor is controlled. A controlled stereoscopic effect control value and a monitor size of the display monitor used to display the stereoscopic image when the stereoscopic effect is controlled is associated with the multi-viewpoint image and recorded in a recording medium.

6 Claims, 20 Drawing Sheets

(51) Int. Cl.
  *H04N 13/02* (2006.01)
  *G03B 35/10* (2006.01)
  *G03B 35/18* (2006.01)
(52) U.S. Cl.
  CPC ....... *H04N13/0022* (2013.01); *H04N 13/0055* (2013.01); *H04N 13/0066* (2013.01); *H04N 13/0203* (2013.01)

(56) References Cited

U.S. PATENT DOCUMENTS

| | | | |
|---|---|---|---|
| 2005/0219239 A1* | 10/2005 | Mashitani et al. | 345/419 |
| 2009/0142041 A1* | 6/2009 | Nagasawa et al. | 386/124 |
| 2010/0039504 A1 | 2/2010 | Takahashi et al. | |
| 2011/0150421 A1 | 6/2011 | Sasaki et al. | |
| 2012/0019635 A1* | 1/2012 | Jian | 348/54 |

FOREIGN PATENT DOCUMENTS

| | | |
|---|---|---|
| JP | 2004-129186 A | 4/2004 |
| JP | 2004-180069 A | 6/2004 |
| JP | 2005-73012 A | 3/2005 |
| JP | 2008-172342 A | 7/2008 |
| JP | 2010102137 A | 5/2010 |
| JP | 2011-91481 A | 5/2011 |
| WO | 2010/146847 A1 | 12/2010 |

OTHER PUBLICATIONS

Communication dated Jul. 10, 2014, issued by the State Intellectual Property Office of the People's Republic of China in counterpart Application No. 201180028859.5.

Office Action issued by the Japanese Patent and Trademark Office in Japanese Patent Application No. 2012-519276 dated Dec. 3, 2013.

* cited by examiner

| HEADER |
| --- |
| CONTROL VALUE 1 (3 INCHES): LEFT-EYE IMAGE -6, RIGHT-EYE IMAGE +6 |
| CONTROL VALUE 2 (5 INCHES): LEFT-EYE IMAGE -4, RIGHT-EYE IMAGE +6 |
| CONTROL VALUE 3 (10 INCHES): LEFT-EYE IMAGE -2, RIGHT-EYE IMAGE +4 |

| LEFT-EYE IMAGE | RIGHT-EYE IMAGE |
| --- | --- |
|  |  |

FIG.7A

HEADER
CONTROL VALUE 1 (3 INCHES): LEFT-EYE IMAGE -6
CONTROL VALUE 2 (5 INCHES): LEFT-EYE IMAGE -4
CONTROL VALUE 3 (10 INCHES): LEFT-EYE IMAGE -2

LEFT-EYE IMAGE

HEADER
CONTROL VALUE 1 (3 INCHES): RIGHT-EYE IMAGE +8
CONTROL VALUE 2 (5 INCHES): RIGHT-EYE IMAGE +6
CONTROL VALUE 3 (10 INCHES): RIGHT-EYE IMAGE +4

RIGHT-EYE IMAGE

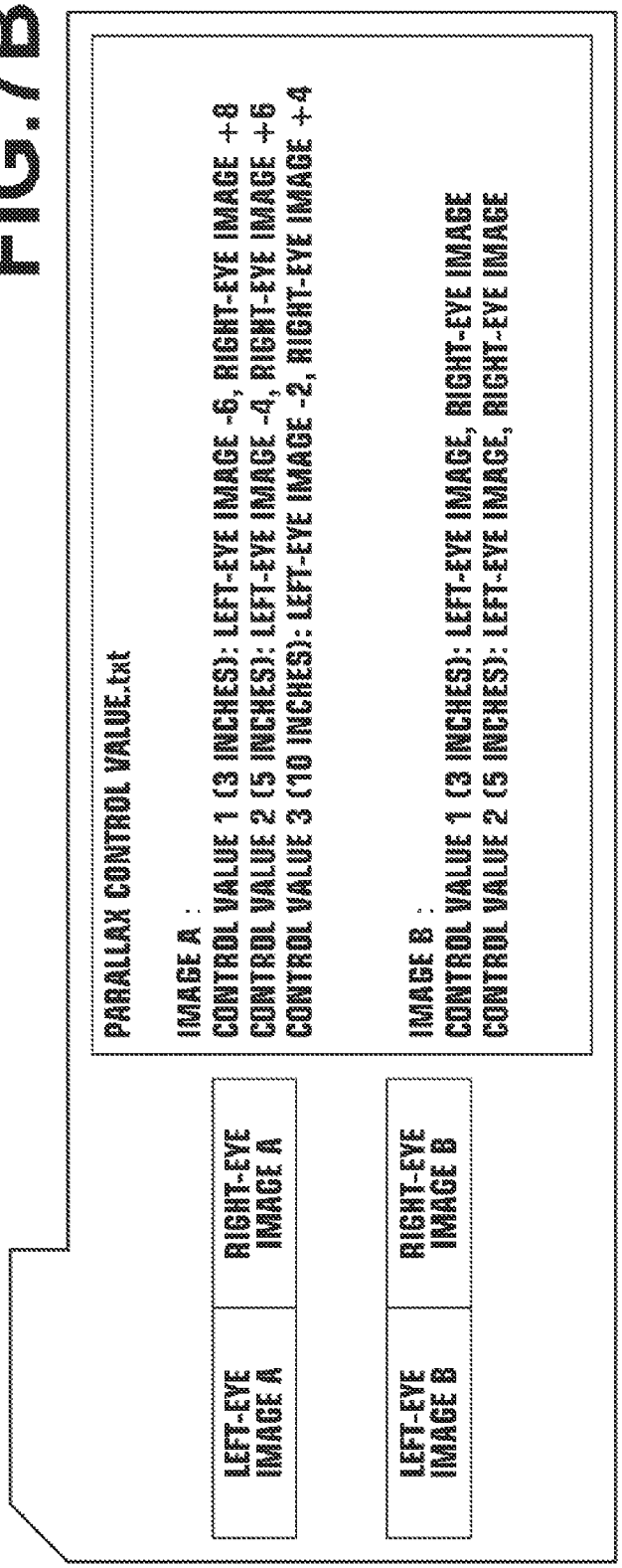

HEADER
CONTROL VALUE (3 INCHES): LEFT-EYE IMAGE -6, RIGHT-EYE IMAGE +8
FACTORS: 5 INCHES 0.75
         10 INCHES 0.5
         15 INCHES 0.25

| LEFT-EYE IMAGE | RIGHT-EYE IMAGE |
|---|---|
|  |  |

```
PARALLAX CONTROL VALUE.txt

IMAGE A:
      CONTROL VALUE 1-1 (3 INCHES)
      CONTROL VALUE 1-2 (3 INCHES)
      CONTROL VALUE 1-3 (3 INCHES)

IMAGE B:
      CONTROL VALUE 2 (3 INCHES)

IMAGE C:
      CONTROL VALUE 3-1 (3 INCHES)
      CONTROL VALUE 3-2 (3 INCHES)
```

STEREOSCOPIC IMAGE DISPLAY DEVICE, STEREOSCOPIC IMAGING DEVICE, AND METHODS

This application is a continuation application based on a PCT Patent Application No. PCT/JP2011/003275, filed Jun. 9, 2011, whose priority is claimed on Japanese Patent Application No. 2010-133545, filed Jun. 11, 2010, the entire contents of which are hereby incorporated by reference.

BACKGROUND OF THE INVENTION

1. Field of the Invention

The present invention relates to a stereoscopic image display device, and more particularly to a stereoscopic image display device for displaying a plurality of images having a parallax therebetween to allow stereoscopic viewing of the images. The invention also relates to a stereoscopic imaging device for capturing images from multiple viewpoints. The invention also relates to a stereoscopic effect control method and a stereoscopic image display method.

2. Description of the Related Art

Techniques to display an image to allow stereoscopic viewing of the image using a plurality of images having a parallax therebetween (a multi-viewpoint image) are known. The multi-viewpoint image includes images captured from two or more viewpoints, typically, a right-eye image and a left-eye image. The multi-viewpoint image can be obtained by capturing the same subject from different positions. The images included in the multi-viewpoint image are combined to generate a stereoscopic image. The stereoscopic display of the stereoscopic image is achieved by using a parallax between the images.

Several specific systems for achieving the stereoscopic display are known. For example, parallel viewing is known as a system that allows stereoscopic display viewed with naked eyes. In parallel viewing, stereoscopic display is achieved by arranging the plurality of images side by side. Further, as systems for achieving the stereoscopic viewing using eye glasses, an anaglyph system and a polarizing filter system are known. In the anaglyph system, a stereoscopic image is generated by combining the plurality of images by superimposing the images one on the other with changing the color of the images, such as into red and blue. In this case, the stereoscopic display of the image can be achieved by viewing the stereoscopic image through red-and-blue glasses. In the polarizing filter system, a stereoscopic image is generated by combining the plurality of images by superimposing the images with different polarization directions one on the other. In the polarizing filter system, the stereoscopic display of the image can be achieved by viewing the stereoscopic image through polarization glasses.

Besides the above-described systems, a parallax barrier system and a lenticular system are known. In these systems, a stereoscopic image is generated by cutting the plurality of images into thin vertical strips and alternately arranging the strips of the images. In the parallax barrier system and the lenticular system, the stereoscopic image is displayed on a stereoscopic display monitor, which allows the stereoscopic viewing without need of the polarization glasses, or the like. Further, a liquid crystal shutter system and a scanning backlight system are known. In the liquid crystal shutter system, the stereoscopic display is achieved by alternately displaying the right-eye image and the left-eye image on a display screen, and driving liquid crystal shutter glasses synchronously with the switching of the displayed image. In the scanning backlight system, optical elements are attached on the display surface of a liquid crystal display device, and the left and right images are alternately displayed at a high speed with different directions of light beams, thereby achieving the stereoscopic display using the afterimage effect.

In general, when a relative offset between the left-eye image and the right-eye image of a stereoscopic image is changed, the stereoscopic effect felt by the user viewing the stereoscopic image changes. That is, a three-dimensional depth of an object in the image felt by the user changes. With respect to the stereoscopic display, it is preferred that the user viewing a stereoscopically displayed image can control the stereoscopic effect. This is because that different users have different preferences about the stereoscopic effect. Some users may prefer a strong stereoscopic effect (a stereoscopic display with enhanced three-dimensional depth), while other users may prefer a moderate stereoscopic effect. Further, the stereoscopic effect felt by the user depends on the user who is viewing the stereoscopic display, and the stereoscopic effect felt by different users viewing the same stereoscopic image may not always be the same.

Japanese Unexamined Patent Publication Nos. 2004-129186 and 10(1998)-090814 (hereinafter, Patent Documents 1 and 2, respectively) disclose performing stereoscopic effect control (parallax control). A stereoscopic image data processing device disclosed in Patent Document 1 includes a three-dimensional depth control unit, which serves as a stereoscopic effect control means. The three-dimensional depth control unit receives an instruction to control the parallax of a stereoscopic image that is stereoscopically displayed. The user operates a three-dimensional depth control bar while viewing a preview display to control the parallax so that a preferred stereoscopic effect is provided. The stereoscopic image data processing device combines the left-eye image and the right-eye image according to a parallax control value determined by the user, and converts the combined image into a stereoscopically displayable format and outputs the converted image. A stereoscopic camera disclosed in Patent Document 2 includes a display means that can perform stereoscopic display. With the technique disclosed in Patent Document 2, such a display means is used to always display a stereoscopic image during a photographing operation, thereby allowing control of the stereoscopic effect of the image during the photographing operation.

Japanese Unexamined Patent Publication No. 2004-180069 (hereinafter, Patent Document 3) discloses a stereoscopic image display device which sets an offset (parallax) between displayed images. The image signal thereof includes a right-eye image and a left-eye image, and suitable size information. The suitable size information is information about a screen size that is suitable for displaying a stereoscopic image. The stereoscopic image display device sets an offset between the right-eye image and the left-eye image based on the suitable size information included in the image signal and information (screen size information) about a display area of a display unit that displays the image. Patent Document 3 teaches that this allows providing a stereoscopic image with an optimal stereoscopic level (depth level) that is controlled depending on the screen size of the display unit. Further, Patent Document 3 teaches that the left-eye image and the right-eye image are displayed with being offset from each other according to a stereoscopic level instructed by the viewer, and the viewer can control the parallax so that an optimal stereoscopic effect is provided.

In the techniques disclosed in Patent Documents 1 and 2, the right-eye image and the left-eye image are combined after the parallax is controlled, and the combined image is converted into a predetermined format before being outputted.

Therefore, the techniques disclosed in Patent Documents 1 and 2 do not allow controlling the once controlled stereoscopic effect later. In contrast, with the technique disclosed in Patent Document 3, the right-eye image and the left-eye image are separately delivered. Therefore, with the technique disclosed in Patent Document 3, the stereoscopic effect can arbitrarily be controlled based on the image signal. However, Patent Document 3 does not mention storing the controlled stereoscopic effect. Therefore, with the technique disclosed in Patent Document 3, even when a preferred stereoscopic effect is achieved through the control, it is necessary to control the stereoscopic effect again when the image is viewed later.

Although this is not a known technique, Japanese Patent Application No. 2009-084719 proposes a method for recording a parallax control value associated with an image. Use of this technique allows arbitrarily controlling the stereoscopic effect and using the controlled stereoscopic effect to view the controlled image later. Using the technique disclosed in Japanese Patent Application No. 2009-084719, the stereoscopic effect of an image captured with an imaging device is controlled during the photographing operation, for example, and the control value resulting from the stereoscopic effect control is associated with the captured image and recorded, so that the stereoscopic effect controlled during the photographing operation can be used later to display the image on a display device.

Now, a case where the stereoscopic effect control of a certain image is performed more than once using a plurality of devices with the technique disclosed in Japanese Patent Application No. 2009-084719, and two or more control values are recorded for the same image is discussed. The display monitors of the devices used to control the stereoscopic effect may have different sizes. For example, in a case where the stereoscopic effect control of the image is performed using three devices and three stereoscopic effect control values are recorded, the three stereoscopic effect control values may have been controlled by the user viewing display monitors having three different monitor sizes.

In a case where the image is displayed on a monitor having the same size as the size of a monitor used to control the stereoscopic effect, the user can view the image displayed with a preferred stereoscopic effect which has been set when the stereoscopic effect is controlled. However, in a case where the image is displayed on a monitor having a size different from the size of a monitor used to control the stereoscopic effect, the user views the image with a different stereoscopic effect from one achieved when the stereoscopic effect is controlled. This is because that, even when the stereoscopic image is generated according to the same stereoscopic effect control value, the stereoscopic effect felt by the user viewing the image varies depending on the size of the display monitor.

The difference of the monitor size is not considered in Japanese Patent Application No. 2009-084719. For example, if three stereoscopic effect control values, which have been controlled with three monitor sizes, are associated with an image and recorded, the stereoscopic effect control values are associated with the image and recorded without being particularly distinguished. That is, each stereoscopic effect control value is recorded in a recording medium in a state where the size of the monitor used to set each stereoscopic effect control value is unclear. Therefore, even when a stereoscopic effect control value that has been controlled with the same monitor size as the size of the display monitor used to display the image is associated with the image and recorded, the stereoscopic effect control value cannot be read out and set for displaying the image.

SUMMARY OF THE INVENTION

In view of the above-described circumstances, the present invention is directed to providing a stereoscopic image display device, a stereoscopic imaging device, a stereoscopic effect control method and a stereoscopic image display method which allow reading out and setting a stereoscopic effect control value that is suitable for a monitor size of a display monitor used to display an image.

In order to accomplish the above-described object, a first aspect of the stereoscopic image display device provided by the invention includes: a stereoscopic image generating unit for generating, based on a multi-viewpoint image including images captured from multiple viewpoints, a stereoscopic image for stereoscopically displaying an image; a display processing unit for displaying the stereoscopic image on a display monitor capable of stereoscopic display; a stereoscopic effect control unit for setting a stereoscopic effect control value for the stereoscopic image generating unit to control a stereoscopic effect of the stereoscopic image displayed on the display monitor; a control value recording unit for associating the stereoscopic effect control value set by the stereoscopic effect control unit and a monitor size of the display monitor used to display the stereoscopic image when the stereoscopic effect is controlled with the multi-viewpoint image and recording the stereoscopic effect control value and the monitor size in a recording medium; and a monitor size obtaining unit for obtaining the monitor size of the display monitor, wherein, at the time of image display, the stereoscopic effect control unit reads out, from the recording medium, the recorded stereoscopic effect control value associated with the multi-viewpoint image to be displayed and corresponding to the monitor size obtained by the monitor size obtaining unit, and set the read out stereoscopic effect control value for the stereoscopic image generating unit.

In the first aspect of the stereoscopic image display device of the invention, if there is no stereoscopic effect control value corresponding to the monitor size obtained by the monitor size obtaining unit, the stereoscopic effect control unit may read out, from the recording medium, a stereoscopic effect control value corresponding to a monitor size closest to the obtained monitor size.

In the first aspect of the stereoscopic image display device of the invention, the control value recording unit may further associate one or more factors corresponding to one or more monitor sizes different from the monitor size of the display monitor used to display the stereoscopic image when the stereoscopic effect is controlled with the multi-viewpoint image and record the factors, and if there is no stereoscopic effect control value corresponding to the monitor size obtained by the monitor size obtaining unit, the stereoscopic effect control unit may read out a stereoscopic effect control value corresponding to a monitor size different from the monitor size obtained by the monitor size obtaining unit and the factors from the recording medium, and may set a value obtained by multiplying the readout stereoscopic effect control value with one of the factors corresponding to the obtained monitor size as the stereoscopic effect control value.

The first aspect of the stereoscopic image display device of the invention may further include a parameter calculation unit for calculating parameters of an estimation formula for estimating the stereoscopic effect control value from the monitor size based on the monitor size of the display monitor used to display the stereoscopic image when the stereoscopic effect is controlled and the stereoscopic effect control value, wherein the control value recording unit may associate the calculated parameters with the image and records the parameters in place of or in addition to the stereoscopic effect control value.

In the first aspect of the stereoscopic image display device of the invention, the stereoscopic effect control unit may read out the parameters of the estimation formula from the recording medium, and may calculate the stereoscopic effect control value based on the read out parameters and the monitor size obtained by the monitor size obtaining unit.

The first aspect of the stereoscopic image display device of the invention may further include a displayed image selection unit for selecting an image to be displayed from multi-viewpoint images recorded in a recording medium, wherein the stereoscopic effect control unit may read out one or more recorded stereoscopic effect control values associated with the multi-viewpoint image selected as the image to be displayed, and may set each of the read out one or more stereoscopic effect control values for the stereoscopic image generating unit, the stereoscopic image generating unit may generate one or more stereoscopic images with one or more stereoscopic effects represented by the set one or more stereoscopic effect control values based on the multi-viewpoint image selected as the image to be displayed, and the display processing unit may sequentially display the one or more stereoscopic images generated by the stereoscopic image generating unit on the display monitor.

In the first aspect of the stereoscopic image display device of the invention, the displayed image selection unit may select a plurality of multi-viewpoint images as images to be displayed, and, if a plurality of stereoscopic effect control values are associated with one multi-viewpoint image, the display processing unit may sequentially display stereoscopic images generated according to the stereoscopic effect control values associated with the one multi-viewpoint image, and then, display a stereoscopic image of a next multi-viewpoint image. Alternatively, the display processing unit may sequentially display a plurality of stereoscopic images generated according to i-th stereoscopic effect control values of the multi-viewpoint images, where i is from 1 to a number of the stereoscopic effect control values, based on the multi-viewpoint images selected as the image to be displayed, and then, display stereoscopic images generated according to i+1th stereoscopic effect control values of the multi-viewpoint images.

In the first aspect of the stereoscopic image display device of the invention, the display processing unit may display the stereoscopic images in the order of the intensity the stereoscopic effect from the weakest.

A second aspect of the stereoscopic image display device of the invention includes: a stereoscopic image generating unit for reading out a multi-viewpoint image to be displayed from a recording medium and generating a stereoscopic image for stereoscopically displaying an image based on the read out multi-viewpoint image, the recording medium storing a multi-viewpoint image including images captured from multiple viewpoints, one or more stereoscopic effect control values for controlling a stereoscopic effect when the multi-viewpoint image is stereoscopically displayed, the stereoscopic effect control values being associated with the multi-viewpoint image, and a monitor size of a display monitor used when the stereoscopic effect control value is controlled, the monitor size being associated with each stereoscopic effect control value; a monitor size obtaining unit for obtaining a monitor size of a display monitor capable of stereoscopic display of the stereoscopic image; a stereoscopic effect control unit for reading out a stereoscopic effect control value associated with the monitor size obtained by the monitor size obtaining unit from one or more stereoscopic effect control values associated with the multi-viewpoint image to be displayed and recorded in the recording medium, and setting the read out stereoscopic effect control value for the stereoscopic image generating unit; and a display processing unit for displaying the stereoscopic image generated by the stereoscopic image generating unit on the display monitor.

In the second aspect of the stereoscopic image display device of the invention, if there is no stereoscopic effect control value corresponding to the monitor size obtained by the monitor size obtaining unit, the stereoscopic effect control unit may read out, from the recording medium, a stereoscopic effect control value corresponding to a monitor size closest to the obtained monitor size. Alternatively, one or more factors corresponding to one or more monitor sizes different from the monitor size of the display monitor used to display the stereoscopic image when the stereoscopic effect is controlled may be further recorded in the recording medium with being associated with the stereoscopic effect control value, and if there is no stereoscopic effect control value corresponding to the monitor size obtained by the monitor size obtaining unit, the stereoscopic effect control unit may read out a stereoscopic effect control value corresponding to a monitor size different from the monitor size obtained by the monitor size obtaining unit and the factors from the recording medium, and may set a value obtained by multiplying the read out stereoscopic effect control value with one of the factors corresponding to the obtained monitor size as the stereoscopic effect control value.

In the second aspect of the stereoscopic image display device of the invention, parameters of an estimation formula for estimating the stereoscopic effect control value from the monitor size may be recorded in the recording medium with being associated with the multi-viewpoint image in place of or in addition to the stereoscopic effect control value, and the stereoscopic effect control unit may read out the parameters of the estimation formula from the recording medium in place of reading out the stereoscopic effect control value from the recording medium, and may calculate a stereoscopic effect control value based on the read out parameters and the monitor size obtained by the monitor size obtaining unit.

The stereoscopic imaging device provided by the invention includes: an imaging unit for capturing a multi-viewpoint image including images captured from multiple viewpoints and recording the multi-viewpoint image in a recording medium; a stereoscopic image generating unit for generating a stereoscopic image for stereoscopically displaying an image based on the multi-viewpoint image; a display processing unit for displaying the stereoscopic image on a display monitor capable of stereoscopic display; a stereoscopic effect control unit for setting a stereoscopic effect control value for the stereoscopic image generating unit to control a stereoscopic effect of the stereoscopic image displayed on the display monitor; a control value recording unit for associating the stereoscopic effect control value set by the stereoscopic effect control unit and a monitor size of the display monitor used to display the stereoscopic image when the stereoscopic effect is controlled with the multi-viewpoint image and recording the stereoscopic effect control value and the monitor size in a recording medium; and a monitor size obtaining unit for obtaining the monitor size of the display monitor, wherein, at the time of image display, the stereoscopic effect control unit reads out, from the recording medium, the recorded stereoscopic effect control value associated with the multi-viewpoint image to be displayed and corresponding to the monitor size obtained by the monitor size obtaining unit, and sets the read out stereoscopic effect control value for the stereoscopic image generating unit.

The stereoscopic effect control method provided by the invention includes the steps of: generating a stereoscopic image for stereoscopically displaying an image based on a multi-viewpoint image including images captured from multiple viewpoints; displaying the stereoscopic image on a display monitor capable of stereoscopic display; controlling a stereoscopic effect of the stereoscopic image in a state where the stereoscopic image is displayed on the display monitor; and associating a stereoscopic effect control value representing the controlled stereoscopic effect and a monitor size of the display monitor used to display the stereoscopic image when the stereoscopic effect is controlled with the multi-viewpoint image and recording the stereoscopic effect control value and the monitor size in a recording medium.

The stereoscopic image display method provided by the invention includes the steps of: reading out a multi-viewpoint image to be displayed from a recording medium, the recording medium storing a multi-viewpoint image including images captured from multiple viewpoints, one or more stereoscopic effect control values for controlling a stereoscopic effect when the multi-viewpoint image is stereoscopically displayed, the stereoscopic effect control values being associated with the multi-viewpoint image, and a monitor size of a display monitor used when the stereoscopic effect control value is controlled, the monitor size being associated with each stereoscopic effect control value; obtaining a monitor size of a display monitor that displays an image to allow stereoscopic viewing thereof; reading out a stereoscopic effect control value associated with the obtained monitor size from one or more stereoscopic effect control values associated with the multi-viewpoint image to be displayed and recorded in the recording medium; generating a stereoscopic image for stereoscopically displaying an image with a stereoscopic effect represented by the read out stereoscopic effect control value based on the multi-viewpoint image to be displayed; and displaying the generated stereoscopic image on the display monitor.

The invention may also provide programs for causing a computer to carry out the above-described stereoscopic effect control method and stereoscopic image display method of the invention, respectively.

In the first aspect of the stereoscopic image display device and the stereoscopic effect control method of the invention, a control value that is set when the stereoscopic effect is controlled is record with being associated with the monitor size of the display monitor. This allows determining the monitor size of a display monitor with which the stereoscopic effect control value has been controlled. As a result, a stereoscopic effect control value which is suitable for the monitor size of a display monitor used to display a certain image can be read out and set when the image is displayed.

In the second aspect of the stereoscopic image display device and the stereoscopic effect control method of the invention, among stereoscopic effect control values recorded with being associated with the image to be displayed, a stereoscopic effect control value recorded with being associated with the monitor size of a display monitor used to display a certain image is read out from the recording medium and set. This allows displaying an image according to a stereoscopic effect control value that is suitable for a display monitor used to display the image.

BRIEF DESCRIPTION OF THE DRAWINGS

FIG. 7A illustrates images and parallax control values that are associated with the images and recorded, FIG. 7B illustrates images and parallax control values that are associated with the images and recorded.

DESCRIPTION OF THE PREFERRED EMBODIMENTS

Figure 1:
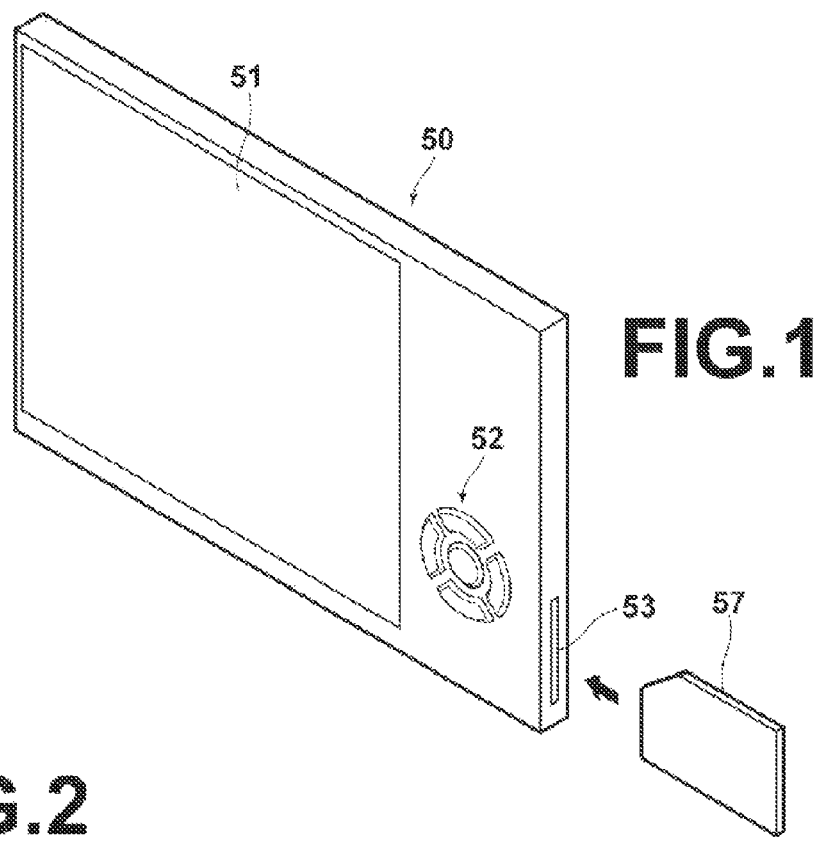
FIG. 1 is a perspective view illustrating the appearance of a display device according to a first embodiment of the present invention.

Hereinafter, embodiments of the present invention will be described in detail with reference to the drawings. FIG. 1 illustrates the appearance of a stereoscopic image display device according to a first embodiment of the invention. A display device 50 includes a display monitor 51, an operation button 52 and a card slot 53. The card slot 53 is a slot for receiving a card-type recording medium 57 inserted therein. The recording medium 57 records a multi-viewpoint image. The recording medium 57 also stores one or more stereoscopic effect control values associated with the multi-viewpoint image. The stereoscopic effect control value is used to control a stereoscopic effect of the multi-viewpoint image when the multi-viewpoint image is stereoscopically displayed. The recording medium 57 stores a monitor size of a display monitor used to control each stereoscopic effect control value with associating the monitor size with the stereoscopic effect control value. The multi-viewpoint image includes the first to n-th viewpoint images (n is an integer of 2 or more) having a parallax therebetween. The multi-viewpoint image typically includes a right-eye image and a left-eye image. The images forming the multi-viewpoint image may be stored in the form of a single file or separate files.

The operation button 52 is used by the user to conduct various settings, etc. The display monitor 51 displays a menu screen for various operations and settings, etc. The display monitor 51 is able to display a stereoscopic image, which is generated based on the multi-viewpoint image, to allow stereoscopic viewing thereof. The stereoscopic display may be achieved using a lenticular system, for example. The lenticular system allows stereoscopic viewing with naked eyes. The stereoscopic display system is not limited to the lenticular system, and may be a parallel viewing with naked eyes, a parallax barrier system, a scanning backlight system, or the like. The display monitor 51 may achieve the stereoscopic display using any system, and may not necessarily use a system that allows stereoscopic viewing with naked eyes. The stereoscopic display system may be a system requiring image separation glasses, such as an anaglyph system, a polarizing filter system or a liquid crystal shutter system.

Figure 2:
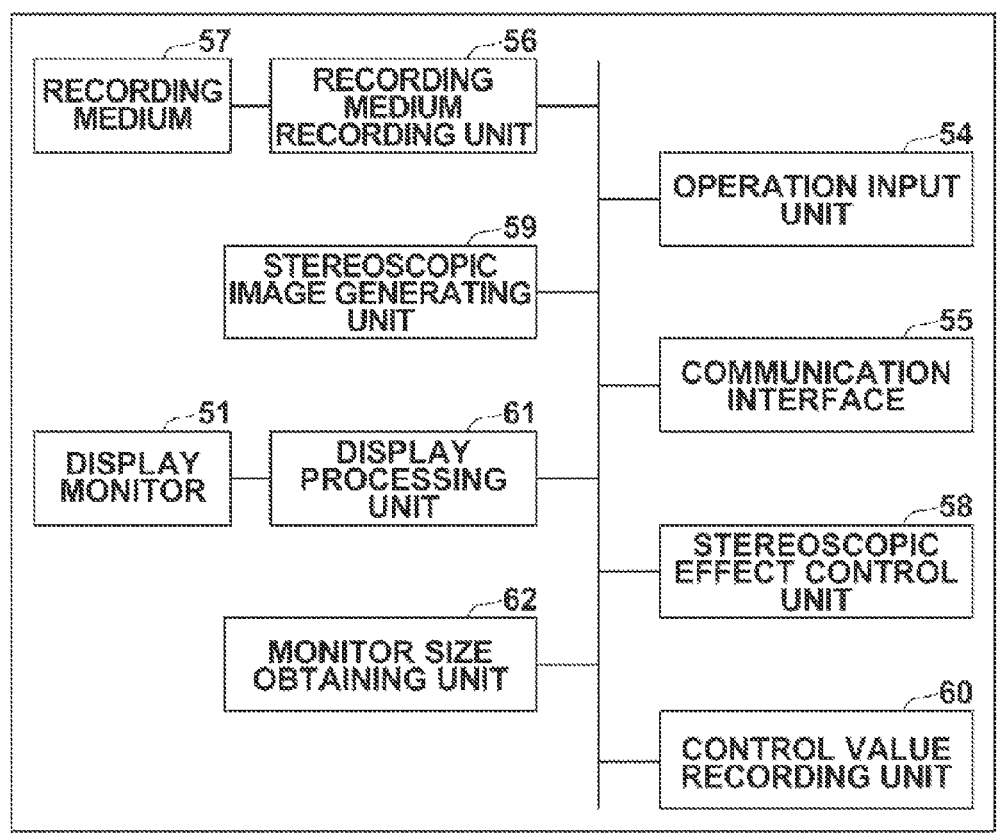
FIG. 2 is a block diagram illustrating the internal configuration of the display device.

FIG. 2 illustrates the internal configuration of the display device 50. The display device 50 further includes an operation input unit 54, a communication interface 55, a recording medium recording unit 56, a stereoscopic effect control unit 58, a stereoscopic image generating unit 59, a control value recording unit 60, a display processing unit 61 and a monitor size obtaining unit 62. The components forming the display device 50 are generally classified into components for displaying a stereoscopic image on the display monitor 51 (a stereoscopic display unit) and components for controlling the stereoscopic effect of the stereoscopic image (a stereoscopic effect control unit). Functions of the individual units of the display device 50 may be implemented by a computer that executes operations according to a predetermined program.

The operation input unit 54 is used to input various operations by the user. The operation button 52 shown in FIG. 1 is included in the operation input unit 54. The user can display an image and control the stereoscopic effect of the displayed image by inputting instructions to the display device 50 via the operation input unit 54. The recording medium recording unit 56 records information in the recording medium 57 and reads out information recorded in the recording medium 57. The recording medium 57 is not limited to a card-type recording medium, and may be any recording medium, such as a memory or a hard disk built in the display device 50.

The communication interface 55 is an interface for communication between the display device 50 and an external device. The communication between the display device 50 and an external device may be achieved via non-contact communication, such as wireless communication or infrared communication, for example. Alternatively, the communication between the display device 50 and an external device may be achieved via cable connection. The display device 50 is able to output the multi-viewpoint image (including the first to n-th viewpoint images) recorded in the recording medium 57 to an external device via the communication interface 55. Alternatively, the display device 50 may receive a multi-viewpoint image inputted thereto via the communication interface 55, and record the inputted multi-viewpoint image in the recording medium 57 via the recording medium recording unit 56.

The stereoscopic image generating unit 59 and the display processing unit 61 correspond to the stereoscopic display unit for achieving stereoscopic displaying of an image. The stereoscopic image generating unit 59 generates a stereoscopic image for stereoscopically displaying the image based on the first to the n-th viewpoint images. The stereoscopic image generating unit 59 reads out the multi-viewpoint image from the recording medium 57 via the recording medium recording unit 56, for example, and generates the stereoscopic image based on the read out multi-viewpoint image.

The stereoscopic image generating unit 59 generates the stereoscopic image according to the stereoscopic display system used by the display monitor 51. For example, in a case where the stereoscopic display system is the lenticular system, and even-number lines of the display area of the display monitor 51 correspond to the right-eye image and odd-number lines of the display area correspond to the left-eye image, the stereoscopic image generating unit 59 generates the stereoscopic image by arranging lines of the right-eye image at even-number lines of the display area of the display monitor 51, and lines of the left-eye image at the odd-number lines of the display area. The display processing unit 61 outputs the stereoscopic image to the display monitor 51 to display the image to allow stereoscopic viewing thereof.

The stereoscopic effect control unit 58 and the control value recording unit 60 correspond to the stereoscopic effect control unit for achieving the stereoscopic effect control of a stereoscopic image. The stereoscopic effect control unit 58 sets a stereoscopic effect control value for the stereoscopic image generating unit 59 to control the stereoscopic effect of the stereoscopic image when the image is stereoscopically displayed on the display monitor 51. The control of the stereoscopic effect is achieved by controlling a parallax between the images included in the multi-viewpoint image. The stereoscopic effect control unit 58 controls the parallax between the images based on an instruction by the user, for example, such that a three-dimensional depth of the displayed image is increased or decreased. The control of the parallax may include, besides arbitrary control by the user, automatic control conducted based on the multi-viewpoint image. It is preferred that the stereoscopic effect control unit 58 controls the stereoscopic effect in a state where the stereoscopic image is displayed on the display monitor 51.

The monitor size obtaining unit 62 obtains the monitor size of the display monitor 51. The monitor size may be defined, for example, by a length of a diagonal line of a rectangular display area. The control value recording unit 60 associates the parallax control value controlled by the stereoscopic effect control unit 58 and the monitor size obtained by the monitor size obtaining unit 62 with the image and records them in the recording medium 57. In other words, the control value recording unit 60 stores the parallax control value associated with the multi-viewpoint image, and stores the monitor size of the display monitor, which is used to control the parallax control value, associated with the parallax control value. The control value recording unit 60 can record a plurality of parallax control values for a single image. If a parallax control value has already been associated with the image and recorded, the control value recording unit 60 may prompt the user to select whether to overwrite the recorded parallax control value or to add the new parallax control value.

The recording medium 57 can be moved from one device to another device. For example, there may be a case where, after the stereoscopic effect control is performed using a display device and the control value is recorded in the recording medium, the recording medium is inserted in another display device to display the image on the display device. If the monitor size of the display monitor used to control the stereoscopic effect and that of the display monitor used to display the image are the same, the image can be displayed with the same stereoscopic effect as that achieved when the stereoscopic effect is controlled. However, if the monitor size of the display monitor used to control the stereoscopic effect and that of the display monitor used to display the image are different from each other, the stereoscopic effect felt by the user viewing the displayed image is different from the stereoscopic effect achieved by the stereoscopic effect control.

In this embodiment, information about the monitor size is added to the parallax control value, so that the information is used to display the image. When the image is displayed, the stereoscopic effect control unit 58 obtains the monitor size of the display monitor 51, on which the image is to be displayed, from the monitor size obtaining unit 62. The stereoscopic effect control unit 58 reads out, among the one or more recorded parallax control values associated with the multi-viewpoint image to be displayed, a parallax control value that corresponds to the monitor size obtained from the monitor size obtaining unit 62. The stereoscopic effect control unit 58 sets the read out parallax control value for the stereoscopic image generating unit 59.

For example, it is assumed that a parallax control value A corresponding to a monitor size A and a parallax control value B corresponding to a monitor size B are recorded for a certain multi-viewpoint image. When the image is displayed, the stereoscopic effect control unit 58 reads out the parallax control value A from the recording medium 57 if the monitor size obtained by the monitor size obtaining unit 62 is the monitor size A, or reads out the parallax control value B from the recording medium 57 if the monitor size is the monitor size B. If there is no parallax control value corresponding to the monitor size obtained by the monitor size obtaining unit 62, the stereoscopic effect control unit 58 reads out one of the parallax control values that corresponds to a monitor size closest to the obtained monitor size from the recording medium.

Figure 3:
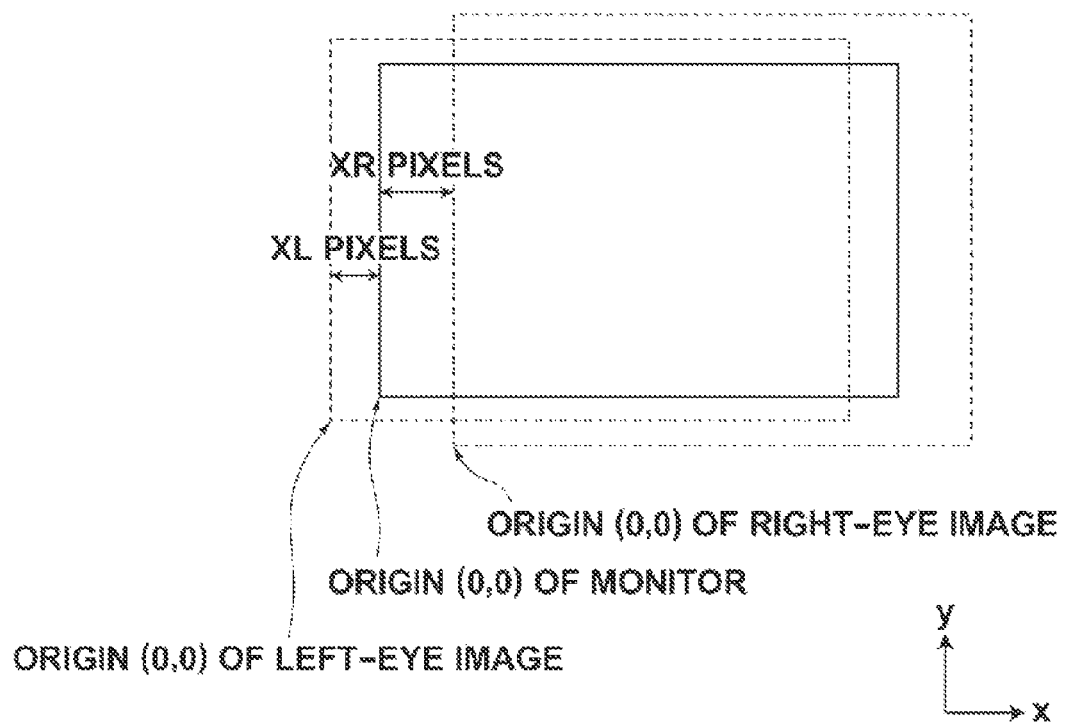
FIG. 3 is a schematic diagram illustrating parallax control.

FIG. 3 illustrates the parallax control. In this example, a case where the stereoscopic image is generated by arranging lines of the right-eye image at even-number lines of the display area and lines of the left-eye image at odd-number lines of the display area is described. A lower-left point relative to the plane of the drawing is defined as the origin. It should be noted that, although the display area and the images shown in FIG. 3 have different sizes in the y-direction to clearly show how the images overlap with each other, the number of pixels of the display area of the monitor in the y-direction (the image size in the y-direction) is actually the same as the image size of the right-eye image and the left-eye image in the y-direction. With respect to the x-direction, the right-eye image and the left-eye image have the same image size in the x-direction, and the image size of the stereoscopic image in the x-direction is about twice the image size of the right-eye image and the left-eye image in the x-direction.

In a case where the stereoscopic effect control is not performed, in other words, in a case where the stereoscopic display is performed with the original parallax between the right-eye image and the left-eye image, the stereoscopic image generating unit 59 arranges the 0th line, 1st line, 2nd line, and so forth of the right-eye image at the 0th line, 2nd line, 4th line, and so forth of the display area, and arranges the 0th line, 1st line, 2nd line, and so forth of the left-eye image at the 1st line, 3rd line, 5th line, and so forth of the display area. When the user controls the stereoscopic effect, the stereoscopic image generating unit 59 combines the right-eye image and the left-eye image with shifting relative positions of the images. For example, if the user instructs to strengthen the stereoscopic effect, the stereoscopic effect control unit 58 translates the right-eye image rightward relative to the plane of the drawing and translates the left-eye image leftward relative to the plane of the drawing. In contrast, when the user instructs to weaken the stereoscopic effect, the stereoscopic effect control unit 58 translates the right-eye image leftward relative to the plane of the drawing and translates the left-eye image rightward relative to the plane of the drawing.

In this embodiment, the control value of the stereoscopic effect (parallax) is represented by differences between the positions of the right-eye image and the left-eye image in the x-direction before the stereoscopic effect control and the positions of the right-eye image and the left-eye image after the stereoscopic effect control. For example, in a case where the right-eye image is shifted rightward relative to the plane of the drawing by a distance corresponding to XR pixels (XR is a positive even number) of the stereoscopic image and the 0th line of the right-eye image is arranged at the XR-th line of the stereoscopic image (display area) after the stereoscopic effect control, the parallax control value of the right-eye image is "rightward by XR pixels". In contrast, in a case where the right-eye image is shifted leftward relative to the plane of the drawing by a distance corresponding to XR pixels, the 0th line of the right-eye image is arranged at the −XR-th line of the stereoscopic image, which is actually not present. In this case, since the right-eye image is arranged at every other line, the (XR/2)-th line of the right-eye image is arranged at the 0th line of the stereoscopic image. The control value of the parallax in this case is "leftward by XR pixels". When the leftward shift is represented by the negative symbol, the parallax control value is expressed as "−XR".

In a case where the left-eye image is shifted leftward relative to the plane of the drawing by a distance corresponding to XL pixels (XL is a positive even number), the 0th line of the left-eye image to be arranged at the 1st line of the stereoscopic image is arranged at the (−XL+1)-th line of the stereoscopic image, which is actually not present. In this case, since the left-eye image is arranged at every other line, the (XL/2)-th line of the left-eye image is arranged at the 1st line of the stereoscopic image. The control value of the parallax in this case is "leftward by XL pixels" (−XL). In contrast, in a case where the left-eye image is shifted rightward relative to the plane of the drawing by a distance corresponding to XL pixels of the stereoscopic image, and the 0th line of the left-eye image is arranged at the (XL+1)-th line of the stereoscopic image (display area), the parallax control value of the left-eye image is "rightward by XL pixels" (+XL). It should be noted that, since the right-eye image and the left-eye image are alternately arranged, XR/2 and XL/2 may be defined as the parallax control value.

Figures 4, 5:
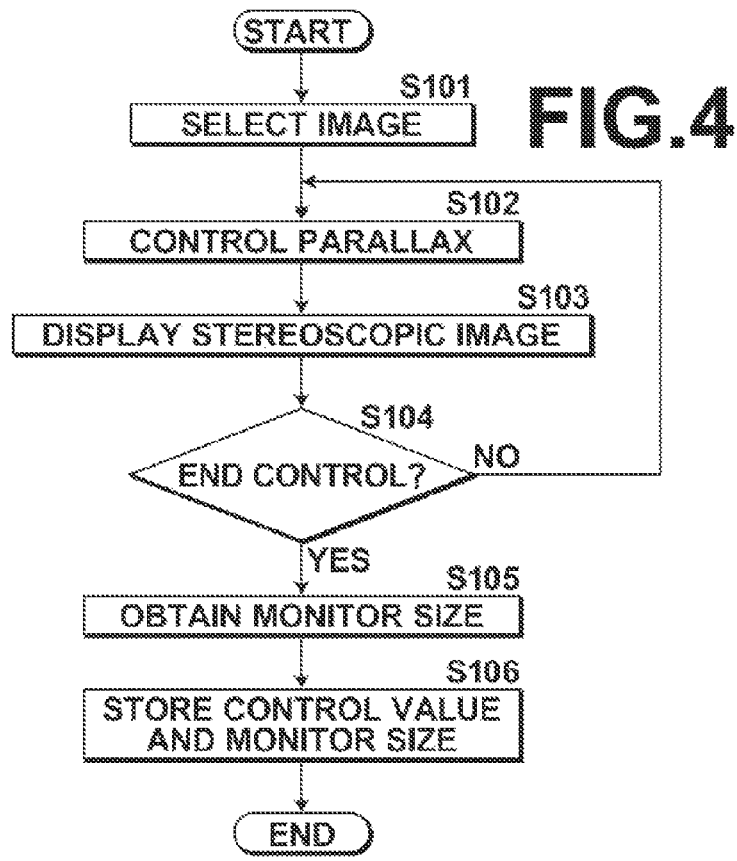
FIG. 4 is a flowchart illustrating a process for controlling a stereoscopic effect.
FIG. 5 illustrates images and parallax control values that are associated with the images and recorded.

FIG. 4 illustrates a process for controlling the stereoscopic effect. The user selects one of images recorded in the recording medium 57 (step S101). Alternatively, the display device 50 may select any one of the images recorded in the recording medium 57. The stereoscopic image generating unit 59 generates a stereoscopic image based on the selected image, and the display processing unit 61 displays the stereoscopic image on the display monitor 51. At this time, the stereoscopic effect control unit 58 may check whether or not a parallax control value corresponding to the monitor size of the display monitor is associated with the selected image and recorded. If the parallax control value is present, the stereoscopic effect control unit 58 may set a parallax according to the parallax control value for the stereoscopic image generating unit 59. If no parallax control value is present, the stereoscopic image generating unit 59 may generate the stereoscopic image with a parallax of 0. Alternatively, the stereoscopic effect control unit 58 may read out a parallax control value corresponding to the monitor size of the display monitor associated with another image and recorded from the recording medium 57 and set the parallax control value for the stereoscopic image generating unit 59.

The stereoscopic effect control unit 58 controls the stereoscopic effect of the image selected in step S101 (step S102). The stereoscopic effect control may be performed automatically by the stereoscopic effect control unit 58 based on the multi-viewpoint image, or may be performed based on an instruction by the user by prompting the user to control the parallax. The parallax control may preferably be performed while the user checks the stereoscopic image, which is generated with the controlled parallax by the stereoscopic image generating unit 59, displayed on the display monitor 51.

For example, the stereoscopic effect control unit 58 displays, on the display monitor 51, a bar indicating intensity levels of the stereoscopic effect and a slider indicating a current intensity of the stereoscopic effect to receive an instruction from the user about the intensity of the stereoscopic effect. For example, the user presses a "right" or "left" key of a cursor key included in the operation button 52 (FIG. 1) to move the slider in a direction of "stronger" or "weaker", thereby instructing the intensity of the stereoscopic effect. The stereoscopic effect control unit 58 changes the parallax according to the instruction by the user. For example, when the user moves the slider in the direction of "stronger", the stereoscopic effect control unit 58 shifts the right-eye image rightward relative to the plane of FIG. 3, and shifts the left-eye image leftward relative to the plane of FIG. 3. In contrast, when the user moves the slider in the direction of "weaker", the stereoscopic effect control unit 58 shifts the right-eye image leftward relative to the plane of FIG. 3, and shifts the left-eye image rightward relative to the plane of FIG. 3. The image with the changed parallax is displayed on the display monitor 51. Then, the user can repeat the control until a desired stereoscopic effect is achieved while viewing the display monitor 51. When the parallax control value has exceeded a controllable range, the stereoscopic effect control unit 58 may display an indication to that effect on the display monitor 51.

The stereoscopic image generating unit 59 generates a stereoscopic image with the parallax controlled by the stereoscopic effect control unit 58. The display processing unit 61 displays the stereoscopic image on the display monitor 51 (step S103). When the user instructs to redo the control, the stereoscopic effect control unit 58 may cancel the control made so far and return the parallax control value to the initial state.

The stereoscopic effect control unit 58 determines whether or not the user has instructed to end the control (step S104). If the user has not instructed to end the control, the process returns to step S102 to continue the stereoscopic effect control. If the user has instructed to end the control, the monitor size obtaining unit 62 obtains the monitor size of the display monitor 51 (step S105). The control value recording unit 60 associates the controlled parallax control value and the monitor size obtained in step S105 with the image selected in step S101 and records them (step S106).

FIG. 5 illustrates images and parallax control values that are associated with the image and recorded. In this example, a case where the stereoscopic effect control is performed on a certain image using three devices having different monitor sizes is described. The stereoscopic effect control unit of each device records the monitor size of the display monitor and the parallax control value in the header of the file of the multi-viewpoint image. As shown in FIG. 5, three parallax control values are recorded together with the monitor sizes in the file header.

Figure 6:
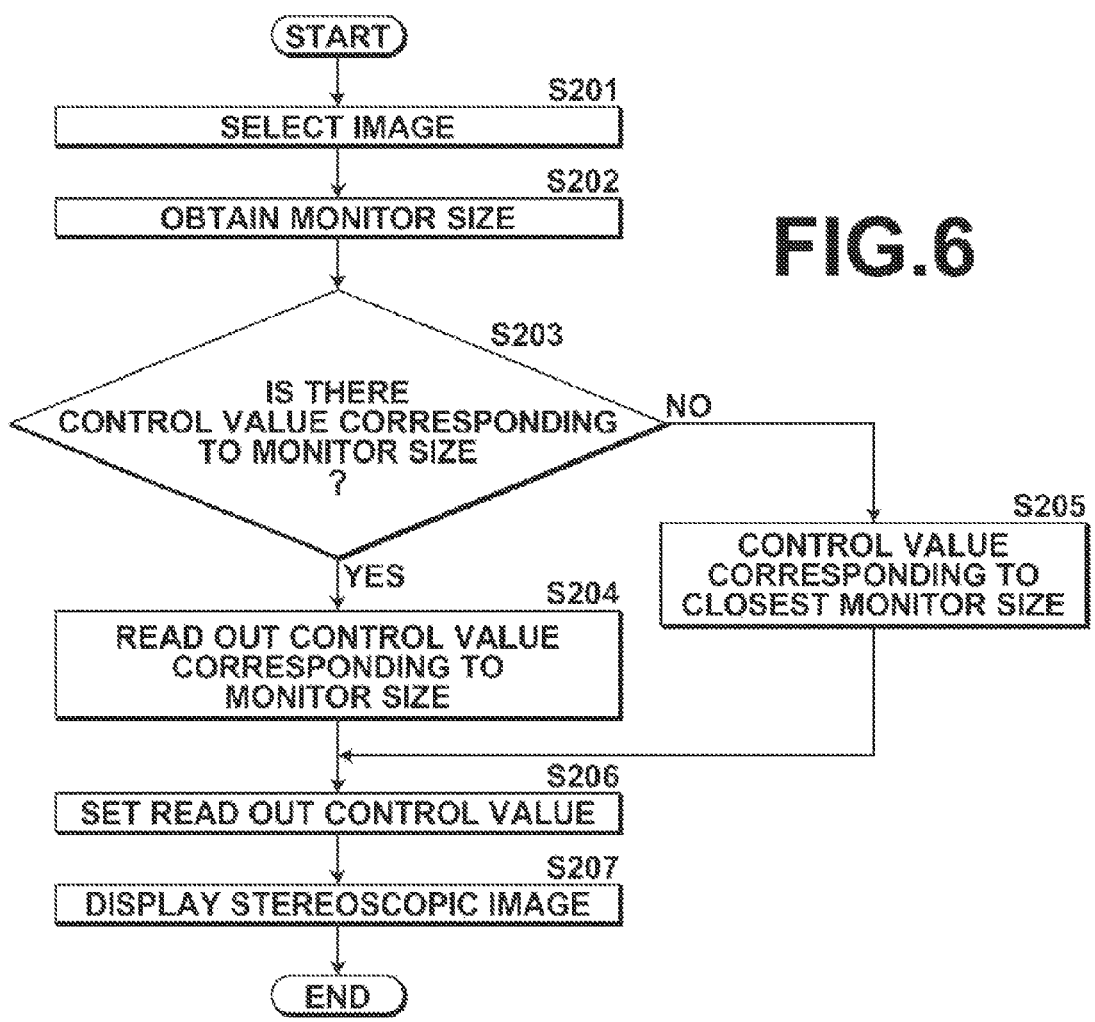
FIG. 6 is a flow chart illustrating a process for displaying an image.

FIG. 6 illustrates a process for displaying the image. The user selects one of images recorded in the recording medium 57 (step S201). Alternatively, the display device 50 may select any one of the images recorded in the recording medium 57. The monitor size obtaining unit 62 obtains the monitor size of the display monitor 51 (step S202).

The stereoscopic effect control unit 58 references the recording medium 57 to determine whether or not a parallax control value corresponding to the monitor size obtained in step S202 is recorded for the image selected in step S201 (step S203). If it is determined that the parallax control value is recorded, the stereoscopic effect control unit 58 reads out the parallax control value corresponding to the monitor size obtained in step S202 from the recording medium 57 (step S204). In contrast, if it is determined in step S203 that the parallax control value is not recorded, the stereoscopic effect control unit 58 reads out, from the recording medium 57, a parallax control value corresponding to a monitor size that is closest to the monitor size obtained in step S202, among the recorded parallax control values associated with the image selected in step S201 (step S205).

The stereoscopic effect control unit 58 sets the parallax control value read out in step S204 or S205 for the stereoscopic image generating unit 59 (step S206). The stereoscopic image generating unit 59 generates a stereoscopic image with the set parallax control value. The display processing unit 61 displays the stereoscopic image on the display monitor 51 (step S207).

For example, a case where the image data and the parallax control values shown in FIG. 5 are recorded in the recording medium 57 is described. When the image is displayed using the display device 50, if the monitor size of the display monitor 51 is 3 inches, the stereoscopic effect control unit 58 reads out, in step S204, the parallax control value of "left-eye image −6, right-eye image +8". In this case, the stereoscopic image generating unit 59 generates the stereoscopic image by shifting the pixels of the left-eye image leftward by 6 pixels from the original display position (the display position when the parallax is 0), and pixels of the right-eye image rightward by 8 pixels from the original display position.

If the monitor size of the display monitor 51 is 7 inches, there is no parallax control value corresponding to stereoscopic effect control with a 7-inch display monitor recorded in the recording medium 57, and therefore one of the recorded three parallax control values is used. The stereoscopic effect felt by the user varies depending on the monitor size. Therefore, in order to display the image with a stereoscopic effect that is close to the stereoscopic effect which has controlled by the user during the stereoscopic effect control as possible, it is preferred to use a parallax control value corresponding to a monitor size that is closest to the monitor size of 7 inches among the parallax control values recorded in the recording medium 57. In the case shown in FIG. 5, a monitor size closest to the monitor size of 7 inches among the three monitor sizes is 5 inches. Therefore, the stereoscopic effect control unit 58 reads out, in step S205, the parallax control value corresponding to the monitor size of 5 inches, i.e., "left-eye image −4, right-eye image +6".

In this embodiment, the control value recording unit 60 associates the parallax control value and the monitor size with the image and records them. In this manner, the size of the monitor used to control the stereoscopic effect is associated with each parallax control value. By associating the monitor size with the parallax control value, a parallax control value that is suitable for the monitor size of the display monitor used to display the image can be read out from the recording medium when the image is displayed.

In general, when a stereoscopic image generated according to a certain parallax control value is displayed, the stereoscopic effect felt by the user (viewer) is stronger as the monitor size is larger. Therefore, in a case where the image is displayed on a display monitor having a size larger than the size of a monitor used to control the stereoscopic effect, the stereoscopic effect may be excessively strong if the image is displayed according to the control value of the stereoscopic effect that has been controlled while viewing the display monitor having the smaller monitor size. In this embodiment, the parallax control value and the monitor size are associated with the image and recorded, thereby allowing selecting a parallax control value that is suitable for the size of the display monitor. By displaying the image according to the thus selected parallax control value, the image can be displayed with a stereoscopic effect that is preferred by the user.

It should be noted that the manner of associating the parallax control value with the image is not limited to one shown in FIG. 5, and the association may be achieved in any other manner. FIGS. 7A to 7D illustrate other examples of images and parallax control values that are associated with the images and recorded. In the example shown in FIG. 7A, parallax control values are recorded in the header of the image file, similarly to the example shown in FIG. 5. The difference from the example shown in FIG. 5 is that a separate file is generated for each image forming the multi-viewpoint image. In this case, the control value recording unit 60 records the control value and the monitor size in the header of each image file.

Figure 7C:
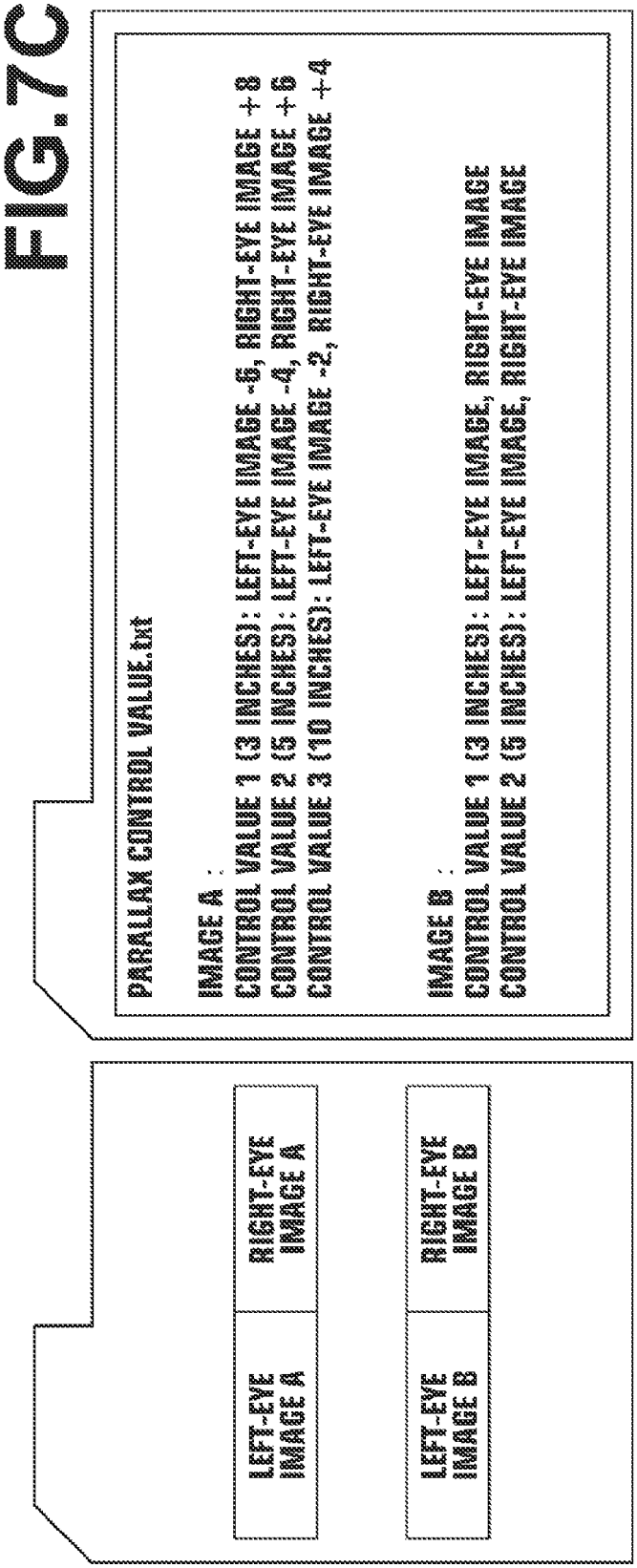
FIG. 7C illustrates images and parallax control values that are associated with the images and recorded.

FIGS. 7B and 7C illustrate examples where a file(s) for recording the parallax control values is generated separately from the image data files. For example, the multi-viewpoint images may be grouped into separate groups, and the file (parallax control value recording file) for recording the parallax control values may be generated for each group. The parallax control value recording file may, for example, be a text file. The grouping may be performed in any manner. For example, the images may be grouped based on the storage location thereof. Alternatively, attribute information, such as photographing time and date and classification of each image, may be associated with the image and recorded, and the grouping may be performed based on the attribute information. In the examples shown in FIGS. 7B and 7C, the images are grouped for each storage folder.

FIG. 7B shows a case where the parallax control value recording file is generated in an image storage folder. In this case, the parallax control values for the images in the same folder are recorded in the same parallax control value recording file ("parallax control value.txt"). Specifically, in a case where a multi-viewpoint image A and a multi-viewpoint image B are present in a certain folder, the parallax control values of the left- and right-eye images and the monitor sizes for the multi-viewpoint image A and the parallax control values of the left- and right-eye images and the monitor sizes for the multi-viewpoint image B are recorded in a parallax control value recording file generated in the folder.

FIG. 7C shows a case where the parallax control value recording file is generated at a location different from the storage location (folder) of the image files. The parallax control values and the monitor sizes are recorded in the same manner as that shown in FIG. 7B except that the location of the parallax control value recording file is different from the location of the storage folder of the image data files. For example, a folder for storing the parallax control value recording file is prepared separately from the storage folder of the image data files. Then, a plurality of parallax control value recording files corresponding to a plurality of image data storage folders can be stored in the folder for storing the parallax control value recording files.

Figure 7D:
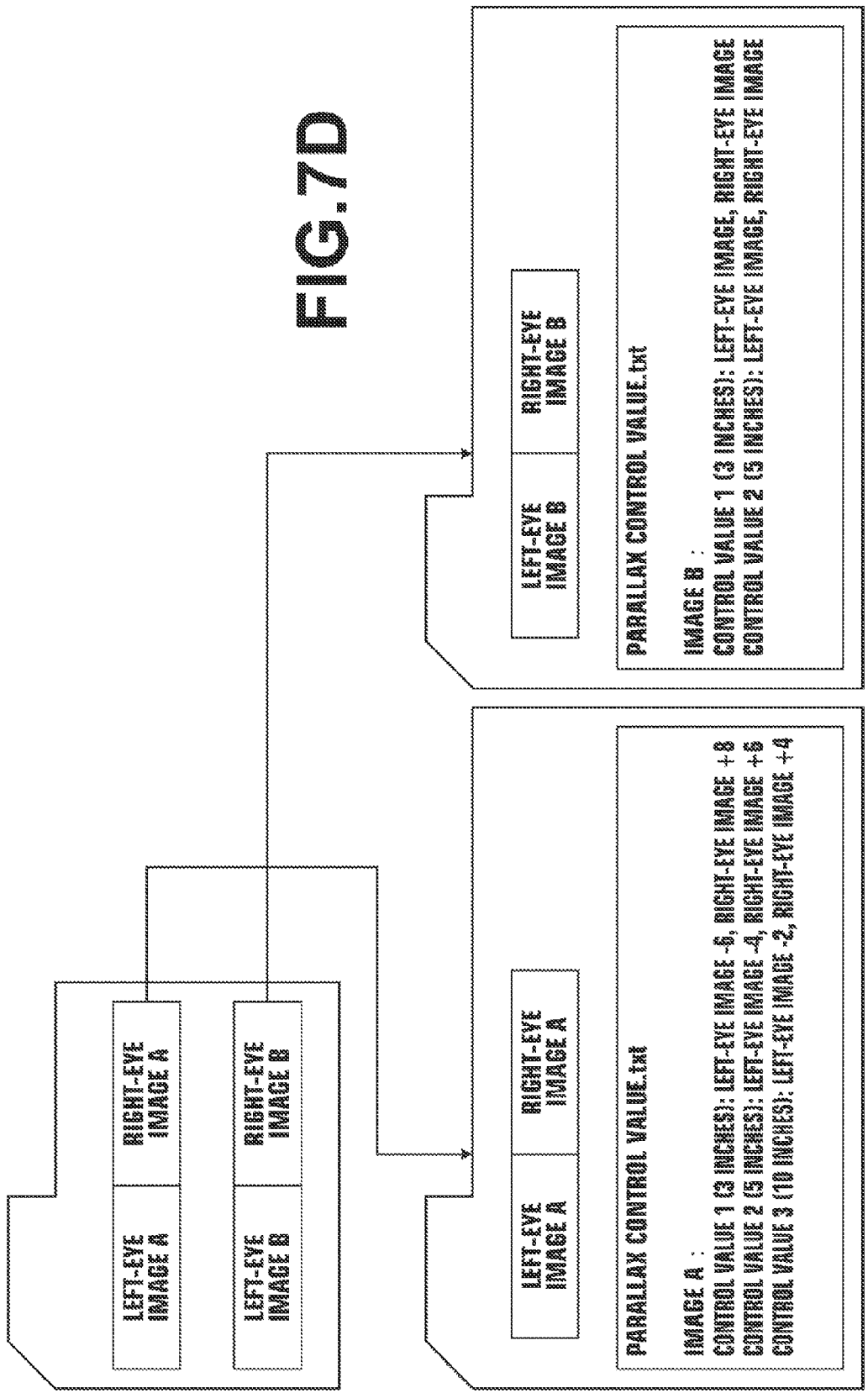
FIG. 7D illustrates images and parallax control values that are associated with the images and recorded.

FIG. 7D shows another example, where a file for recording the parallax control values is generated separately from the image data file, and the parallax control values and the monitor sizes are recorded in the file for recording the parallax control values. In the examples shown in FIG. 7D, a folder corresponding to an image file is generated when the stereoscopic effect control is performed, and a copy of the original image file and the parallax control value recording file are stored in the folder. For example, when the stereoscopic effect control is performed on a multi-viewpoint image A, a folder for the multi-viewpoint image A is generated, and the image file of the multi-viewpoint image A is copied in the folder. Further, the parallax control value recording file is generated in the same folder, and the parallax control values of the images forming the multi-viewpoint image A and the monitor sizes are recorded in the file. When the stereoscopic effect control is performed on another multi-viewpoint image B, a folder for the multi-viewpoint image B is generated, and the image file of the multi-viewpoint image B is copied in the folder. Further, the parallax control value recording file is generated in the folder, and the parallax control values of the images forming the multi-viewpoint image B and the monitor sizes are recorded in the file.

The manner of recording the image data and the parallax control values may be selected by the user. Prior to capturing an image, the user can select whether the first to the n-th viewpoint images forming the multi-viewpoint image are stored as a single file or n files. The recording medium recording unit 56 stores the multi-viewpoint image in the recording medium 57 according to the selection by the user. Further, prior to capturing an image and performing the stereoscopic effect control, the user can select whether the parallax control value is recorded in the header of the image data file or in the parallax control value recording file that is separate from the image data file. The control value recording unit 60 records the parallax control value associated with the image according to the selection by the user.

Next, a second embodiment of the invention is described. The internal configuration of the stereoscopic image display device of this embodiment is the same as that of the display device 50 of the first embodiment shown in FIG. 2. In this embodiment, the control value recording unit 60 associates the monitor size of the display monitor 51 used to display the stereoscopic image during the stereoscopic effect control and a factor(s) corresponding to one or more monitor sizes, which are different from the monitor size of the monitor used during the stereoscopic effect control, with the image and records them.

The control value recording unit 60 associates the parallax control value and the monitor size obtained by the monitor size obtaining unit 62 with the image and records them. In addition, the control value recording unit 60 associates the factor(s) for multiplying the parallax control value corresponding to one or more monitor sizes, which are different from the monitor size obtained by the monitor size obtaining unit 62, with the image and record them. The factor may be changed depending on a distance between the user and the display monitor 51.

When the image is displayed, the stereoscopic effect control unit 58 obtains the monitor size of the display monitor 51 to be used to display the image from the monitor size obtaining unit 62. The stereoscopic effect control unit 58 reads out, from the recording medium 57, the parallax control value that is recorded with being associated with multi-viewpoint image to be displayed and corresponds to the monitor size obtained from the monitor size obtaining unit 62. If there is no parallax control value corresponding to the monitor size obtained by the monitor size obtaining unit 62, the stereoscopic effect control unit 58 reads out the parallax control value and one of the factors from the recording medium 57, and sets a value obtained by multiplying the read out stereoscopic effect control value with the factor as the stereoscopic effect control value.

For example, it is assumed that, for a certain multi-viewpoint image, a parallax control value A corresponding to a monitor size A and a factor $k_B$ corresponding to a monitor size B is recorded. Then, if the monitor size obtained by the monitor size obtaining unit 62 when the image is displayed is the monitor size A, the stereoscopic effect control unit 58 reads out the parallax control value A from the recording medium 57. If the obtained monitor size is the monitor size B, the stereoscopic effect control unit 58 reads out the parallax control value A and the factor $k_B$ from the recording medium 57, and sets a value obtained by multiplying the parallax control value A with the factor $k_B$ as the parallax control value corresponding to the monitor size B. If there is no factor corresponding to the monitor size obtained by the monitor size obtaining unit 62, the stereoscopic effect control unit 58 uses one of the factors corresponding to a monitor size that is closest to the obtained monitor size.

Figures 8, 9:
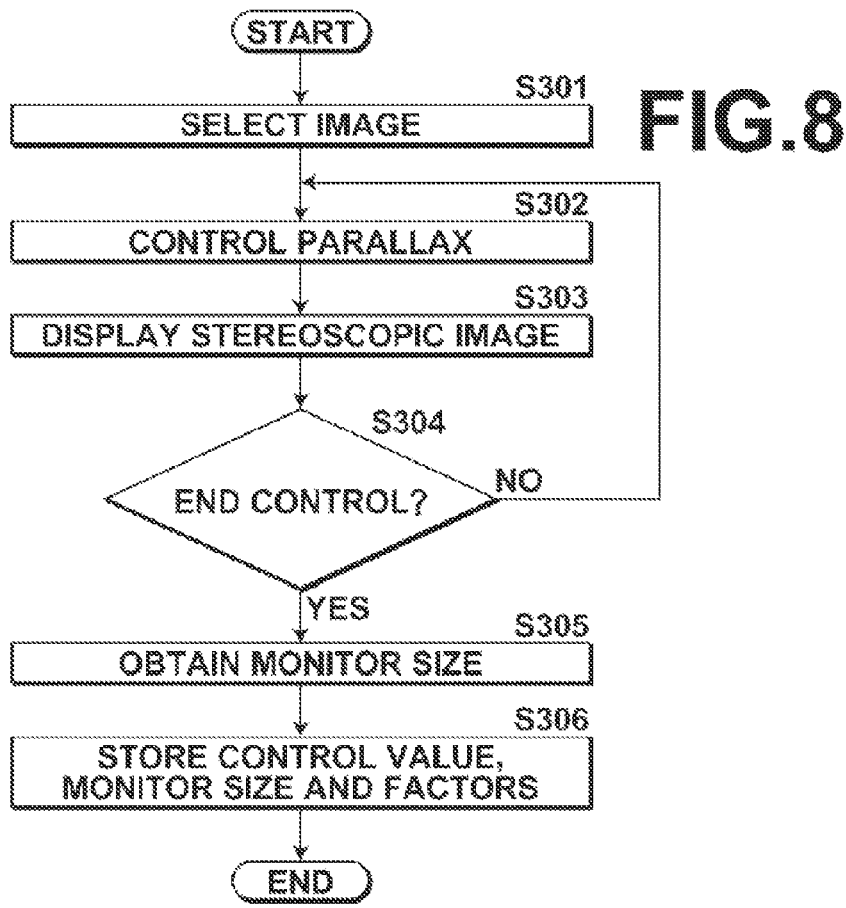
FIG. 8 is a flowchart illustrating a process for controlling a stereoscopic effect according to a second embodiment of the invention.
FIG. 9 illustrates images, a parallax control value that is associated with the images and recorded, and factors corresponding to different monitor sizes.

FIG. 8 illustrates a process for controlling the stereoscopic effect. The user selects one of images recorded in the recording medium 57 (step S301). Alternatively, the display device 50 may select any one of the images recorded in the recording medium 57. The stereoscopic image generating unit 59 generates a stereoscopic image based on the selected image, and the display processing unit 61 displays the stereoscopic image on the display monitor 51. If a parallax control value has already been associated with the image selected in step S301 and recorded, the stereoscopic effect control unit 58 may read out the parallax control value from the recording medium 57 and set the parallax control value for the stereoscopic image generating unit 59.

The stereoscopic effect control unit 58 controls the stereoscopic effect of the image selected in step S301 (step S302). The stereoscopic image generating unit 59 generates a stereoscopic image with the parallax controlled by the stereoscopic effect control unit 58. The display processing unit 61 displays the stereoscopic image on the display monitor 51 (step S303). When the user instructs to redo the control, the stereoscopic effect control unit 58 may cancel the control made so far and return the parallax control value to the initial state.

The stereoscopic effect control unit 58 determines whether or not the user has instructed to end the control (step S304). If the user has not instructed to end the control, the process returns to step S302, and the stereoscopic effect control is continued. If the user has instructed to end the control, the monitor size obtaining unit 62 obtains the monitor size of the display monitor 51 (step S305). These steps may be the same as steps S101 to S105 shown in FIG. 4.

The control value recording unit 60 associates the controlled parallax control value, the monitor size obtained in step S305 and the factor(s) corresponding to one or more monitor sizes different from the monitor size obtained in step S305 with the image selected in step S301 and records them (step S306).

FIG. 9 illustrates images, and a parallax control value and factors corresponding to other monitor sizes that are associated with the images and recorded. It is assumed in this example that the monitor size of the display monitor 51 is 3 inches. The control value recording unit 60 records the monitor size of 3 inches and the parallax control value of "left-eye image −6, right-eye image +8" controlled in step S302 in the header of the file. Further, the control value recording unit 60 records the factors corresponding to monitor sizes other than the monitor size of 3 inches in the header of the file.

It is assumed that the factors corresponding to monitor sizes that are different from the monitor size of the display monitor 51 of the display device 50 are set in advance in the display device 50. For example, if the monitor size of the display device 50 is 3 inches, factors corresponding to monitor sizes of 5 inches, 10 inches and 15 inches are set in advance. The control value recording unit 60 references the set information to record the factors corresponding to the individual monitor sizes. In the example shown in FIG. 9, a factor of 0.75 is set for the monitor size of 5 inches, a factor of 0.5 is set for the monitor size of 10 inches, and a factor of 0.25 is set for the monitor size of 15 inches. Therefore, the control value recording unit 60 records the parallax control value corresponding to the monitor size of 3 inches and the factors corresponding to the individual monitor sizes in the header of the file.

Alternatively, factors to accommodate changes of the monitor size may be set in the display device 50, and a factor corresponding to each monitor size may be determined using the set information. For example, information including a factor of 0.75 for a size difference of 2 inches, a factor of 0.5 for a size difference of 7 inches and a factor of 0.25 for a size difference of 12 inches may be set in the display device 50. In this case, if the monitor size of the display device 50 is 3 inches, the control value recording unit 60 records a factor of 0.75 for the monito size of 5 inches, a factor of 0.5 for the monito size of 10 inches, and a factor of 0.25 for the monito size of 15 inches in the header of the file together with the parallax control value for the monitor size of 3 inches.

It should be noted that the images may be stored in any manner. For example, the left-eye image and the right-eye image may be stored in separate files, as shown in FIG. 7A. The association between the image and the parallax control value may be achieved in any manner. For example, the parallax control value may be managed in a separate file from the image file, as shown in FIGS. 7B to 7D.

Figure 10:
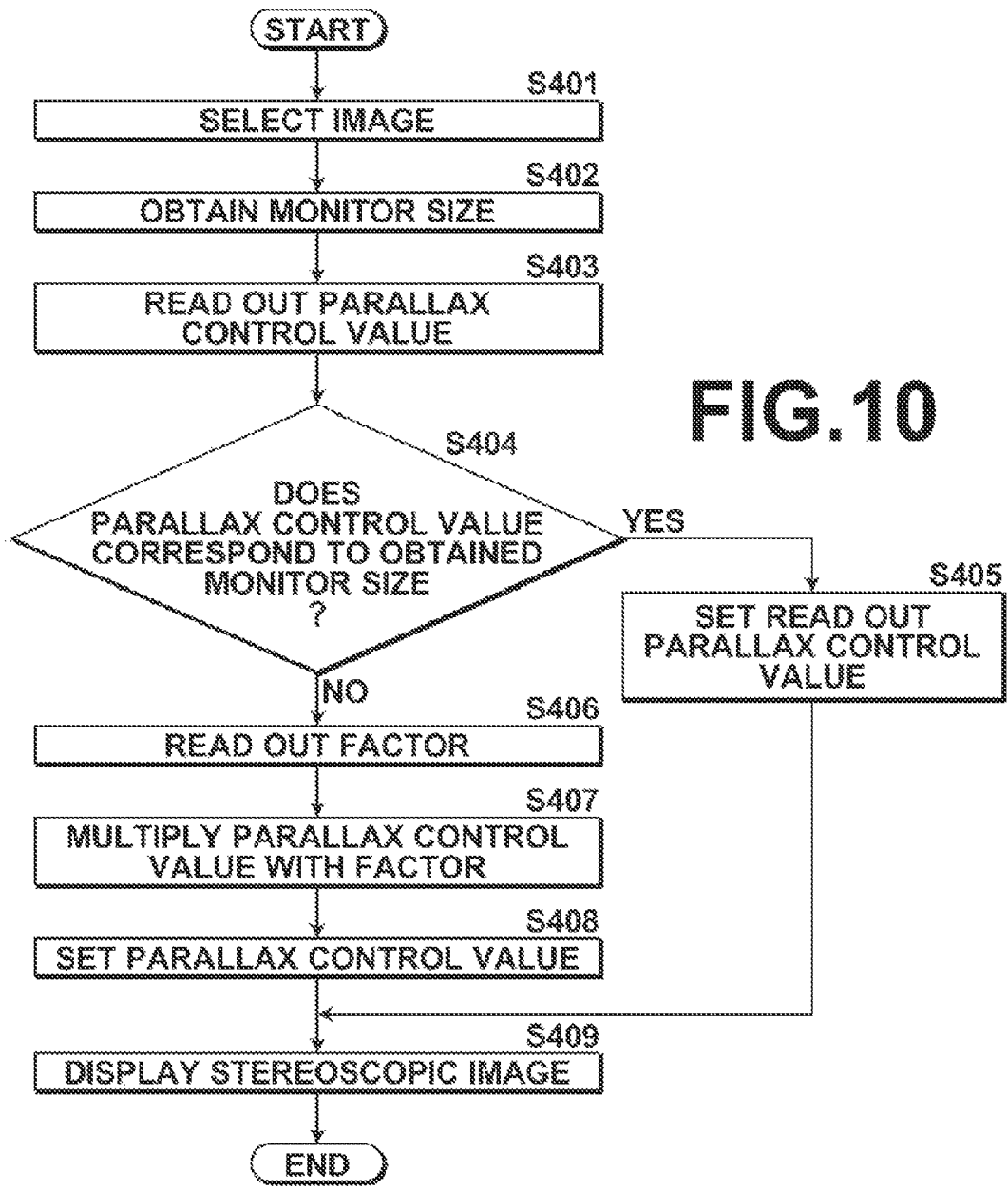
FIG. 10 is a flowchart illustrating a process for displaying an image according to the second embodiment.

FIG. 10 illustrates a process for displaying the image. The user selects one of images recorded in the recording medium 57 (step S401). Alternatively, the display device 50 may select any one of the images recorded in the recording medium 57. The monitor size obtaining unit 62 obtains the monitor size of the display monitor 51 (step S402).

The stereoscopic effect control unit 58 reads out the parallax control value that is recorded with being associated with the image selected in step S401 from the recording medium 57 (step S403). The stereoscopic effect control unit 58 determines whether or not the read out parallax control value corresponds to the monitor size obtained in step S402 (step S404). If it is determined that the read out parallax control value corresponds to the obtained monitor size, the stereoscopic effect control unit 58 sets the read out parallax control value for the stereoscopic image generating unit 59 (step S405). The stereoscopic image generating unit 59 generates a stereoscopic image according to the set parallax control value. The display processing unit 61 displays the stereoscopic image on the display monitor 51 (step S409).

If it is determined in step S404 that the read out parallax control value does not correspond to the obtained monitor size, the stereoscopic effect control unit 58 reads out one of the factors recorded together with the parallax control value in the recording medium 57 (step S406). In step S406, the stereoscopic effect control unit 58 reads out a factor corresponding to the monitor size obtained in step S402 among the factors recorded together with the parallax control value. If there is no factor corresponding to the obtained monitor size, the stereoscopic effect control unit 58 may read out a factor corresponding to a monitor size that is closest to the obtained monitor size.

The stereoscopic effect control unit 58 multiplies the parallax control value read out in step S403 with the factor read out in step S405 (step S407). If the value obtained by multiplying the parallax control value with the factor includes a decimal fraction, the value is converted into integer by an appropriate mathematical operation, such as rounding off, rounding down or rounding up. The stereoscopic effect control unit 58 sets the parallax control value multiplied with the factor for the stereoscopic image generating unit 59 (step S408). The stereoscopic image generating unit 59 generates a stereoscopic image according to the set parallax control value. Then, the process proceeds to step S409, where the display processing unit 61 displays the stereoscopic image on the display monitor 51.

For example, a case where the image file and the parallax control value shown in FIG. 9 are recorded in the recording medium 57 is described. The stereoscopic effect control unit 58 reads out, in step S403, the parallax control value of "left-eye image −6, right-eye image +8". This parallax control value corresponds to a monitor size of 3 inches. If the monitor size obtained by the monitor size obtaining unit 62 in step S402 is 3 inches, the process proceeds from step S404 to step S405, where the stereoscopic effect control unit 58 sets the read out parallax control value for the stereoscopic image generating unit 59.

If the monitor size obtained by the monitor size obtaining unit 62 in step S402 is, for example, 5 inches, then, the process proceeds from step S404 to step S406, where the stereoscopic effect control unit 58 reads out the factor of 0.75 corresponding to the monitor size of 5 inches. The stereoscopic effect control unit 58 multiplies the parallax control value with the factor in step S407, and sets the resulting value as the parallax control value for the stereoscopic image generating unit 59 in step S408. In this case, the factor corresponding to the monitor size of 5 inches is a value smaller than 1. Therefore, in step S409, the image is displayed with a parallax smaller than that according to the parallax control value corresponding to the monitor size of 3 inches.

Specifically, the stereoscopic effect control unit 58 multiplies the parallax control value of −6 of the left-eye image corresponding to the monitor size of 3 inches with the factor of 0.75 corresponding to the monitor size of 5 inches, and sets the value (−4) obtained by converting the resulting value into an integer as the parallax control value of the left-eye image. Further, the stereoscopic effect control unit 58 multiplies the parallax control value of +8 of the right-eye image corresponding to the monitor size of 3 inches with the factor of 0.75 corresponding to the monitor size of 5 inches, and sets the resulting value (+6) as the parallax control value of the right-eye image.

In this embodiment, when the monitor size of the display monitor 51 used to control the stereoscopic effect is different from the monitor size of a display monitor used to display the image, a value obtained by multiplying the parallax control value with the factor is used as the parallax control value. For example, when the monitor size of the display monitor used to view the image is larger than the monitor size of the display monitor used to control the stereoscopic effect, the parallax control value is multiplied with a factor smaller than 1, so that the image is displayed with a weaker stereoscopic effect than that in a case where the original parallax control value is used. In contrast, when the monitor size of the display monitor used to view the image is smaller than the monitor size of the display monitor used to control the stereoscopic effect, the parallax control value is multiplied with a factor larger than 1, so that the image is displayed with a stronger stereoscopic effect than that in a case where the original parallax control value is used. In this embodiment, even when the monitor size of the display monitor used to control the stereoscopic effect is different from the monitor size of the display monitor used to display the image, the image can be displayed with a stereoscopic effect which is preferred by the user when the stereoscopic effect is controlled.

It should be noted that, in a case where the stereoscopic effect control is performed using two different monitor sizes in this embodiment, two parallax control values are associated with the image and recorded, and factors corresponding to the other monitor sizes may be recorded for each parallax control value. For example, when the stereoscopic effect is controlled using the display monitor 51 having a monitor size of 3 inches, information indicating "control value 1 (3 inches), and factors of 0.75 for 5 inches, 0.5 for 10 inches and 0.25 for 15 inches" is associated with the image and recorded. Thereafter, when the stereoscopic effect is controlled using the display monitor 51 having a monitor size of 10 inches, information indicating "control value 2 (10 inches), and factors of 2 for 3 inches, 1.5 for 5 inches and 0.5 for 15 inches" may be associated with the image and recorded in addition to the above control value corresponding to the monitor size of 3 inches and the factors.

In the above-described case, when the monitor size used to display the image is 3 inches, the control value 1 is set as the parallax control value, and when the monitor size used to display the image is 10 inches, the control value 2 is set as the parallax control value. When no control value corresponding to the monitor size used to display the image is recorded, whether to use a value obtained by multiplying the control value 1 with the corresponding factor as the control value or use a value obtained by multiplying the control value 2 with the corresponding factor as the control value may be arbitrarily selected.

For example, one of the control values that results in a smaller change of the parallax may be selected. Specifically, when the monitor size of the display monitor 51 is 5 inches, a difference between the control value 1 and a value resulting from the control value 1×0.75 may be compared with a difference between the control value 2 and a value resulting from the control value 2×1.5, and one of the control values that results in a smaller difference may be selected. Such selection is made because that a dramatic change of the parallax may not always be good for the eyes of the user viewing the image. Selecting the control value with a smaller change is effective to reduce a burden on the eyes of the user.

In a case where the above-described selection cannot be performed, or in place of the above-described selection, one of the control values that provides a smaller parallax value (absolute value) may be selected. Specifically, when the monitor size of the display monitor 51 is 5 inches, a value resulting from the control value 1×0.75 is compared with a value resulting from the control value 2×1.5, and one of the control values with a smaller absolute value may be selected. This is because that selecting one of the control values that provides a larger parallax may likely to result in an excessively large parallax. By selecting the control value that provides a smaller parallax value, an excessively large parallax can be avoided.

Figure 11:
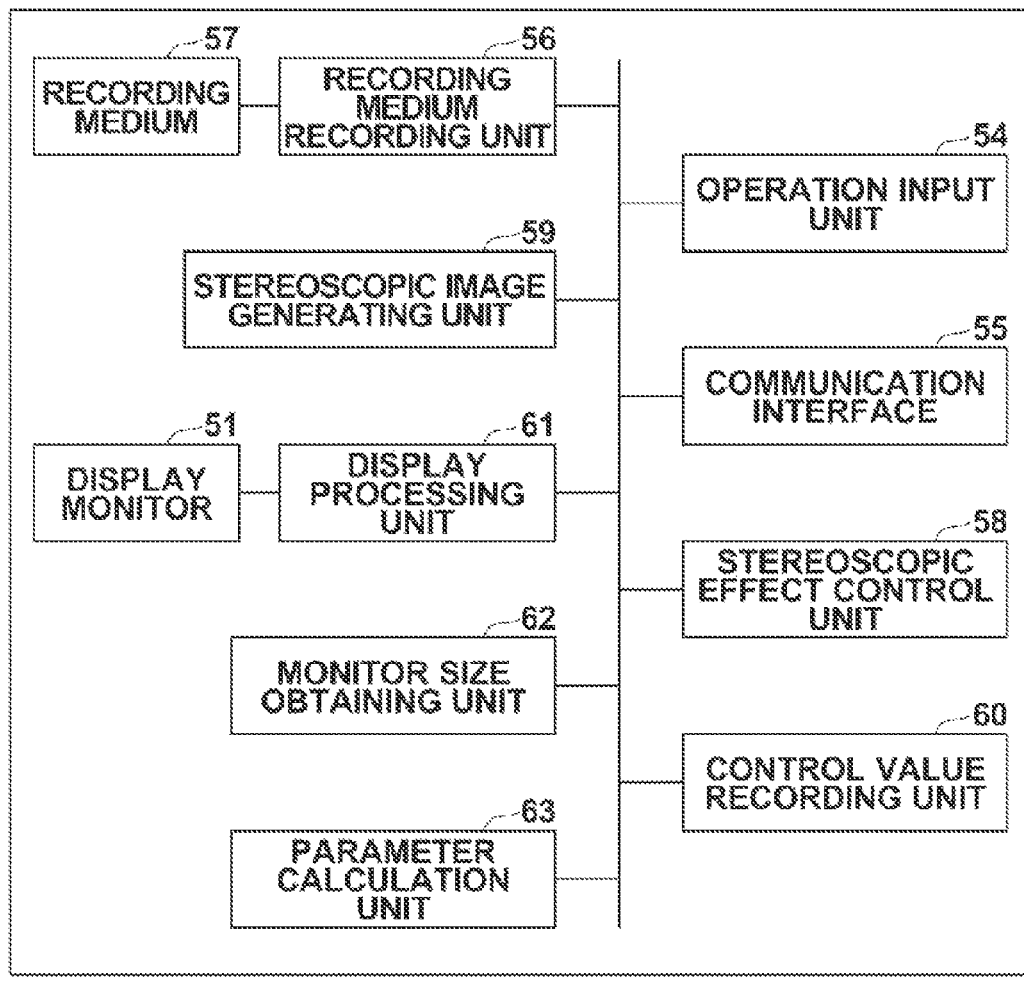
FIG. 11 is a block diagram illustrating the internal configuration of a stereoscopic imaging device according to a third embodiment of the invention.

Next, a third embodiment of the invention is described. FIG. 11 illustrates the internal configuration of a stereoscopic image display device according to the third embodiment. A display device 50a of this embodiment includes a parameter calculation unit 63, in addition to the configuration of the display device 50 of the first embodiment shown in FIG. 2. The display device 50a may have the same appearance as that of the display device 50 of the first embodiment shown in FIG. 1.

The parameter calculation unit 63 calculates parameters of an estimation formula for estimating a parallax control value from a monitor size, based on the monitor size of the display monitor which is used to display the stereoscopic image during the stereoscopic effect control and the parallax control value. As the estimation formula, for example, a linear expression representing a relationship between the monitor size and the parallax control value may be used. In this embodiment, the control value recording unit 60 associates the parameters calculated by the parameter calculation unit 63 with the image and records them.

Figure 12:
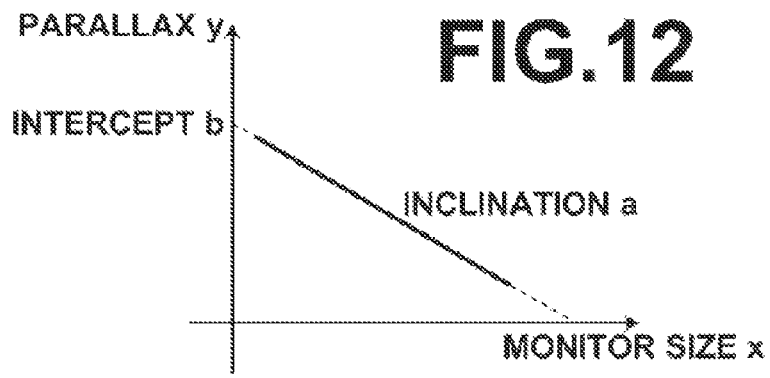
FIG. 12 illustrates one example of an estimation formula.

FIG. 12 illustrates one example of the estimation formula. The horizontal axis (x) represents the monitor size and the vertical axis (y) represents the parallax control value. It is assumed that the relationship (estimation formula) between the monitor size and the parallax control value is represented by y=ax+b, for example. In this case, the parameters calculated by the parameter calculation unit 63 are inclination a and an intercept b. The parameter calculation unit 63 calculates the inclination a and the intercept b based on parallax control values controlled using two different monitor sizes, for example. The estimation formula is not limited to a linear expression, and a higher-order estimation formula may be used.

When the image is displayed, the stereoscopic effect control unit 58 obtains the monitor size of the display monitor 51 used to display the image from the monitor size obtaining unit 62. The stereoscopic effect control unit 58 reads out the parameters of the estimation formula recorded with being associated with the multi-viewpoint image to be displayed from the recording medium 57. The stereoscopic effect control unit 58 determines the parallax control value based on the read out parameters of the estimation formula and the monitor size.

It should be noted that a parallax control value obtained by the calculation based on the parameters of the estimation formula and the monitor size may possibly result in pseudo stereoscopy relative to the parallax control value that is set when the stereoscopic effect is controlled. For example, even when the user has controlled the parallax during the stereoscopic effect control such that a stereoscopic effect stronger than that when the parallax is 0 is provided, the calculated parallax control value may provide a stereoscopic effect weaker than that when the parallax is 0. In such a case, the parallax of 0 may be set as the parallax control value in place of the calculated parallax control value.

Figure 13:
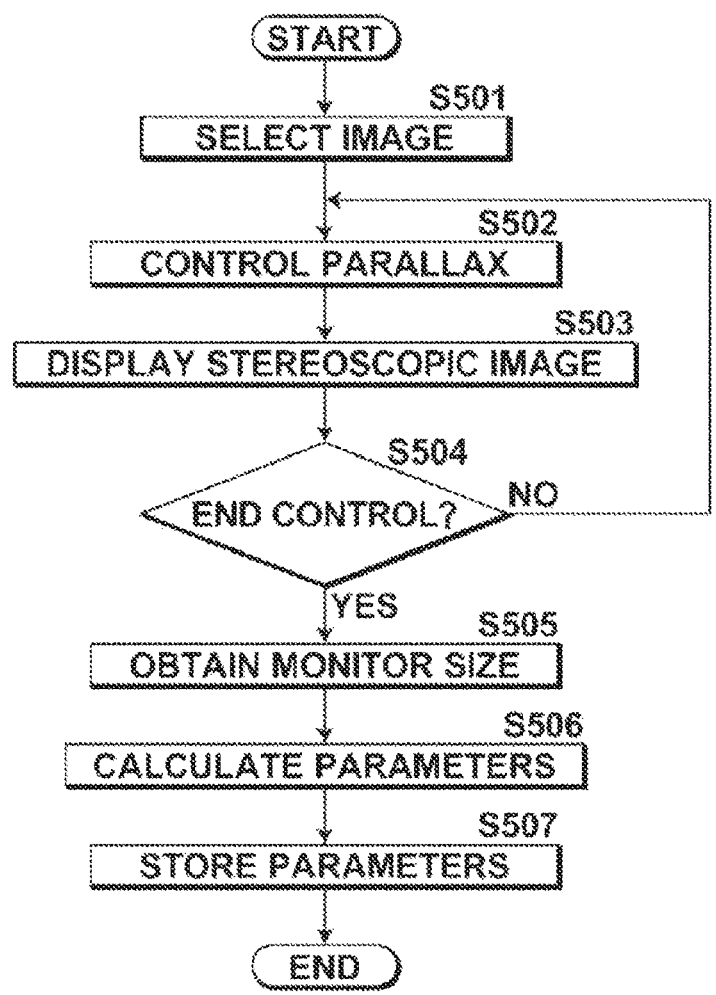
FIG. 13 is a flowchart illustrating a process for controlling a stereoscopic effect according to the third embodiment.

FIG. 13 illustrates a process for controlling the stereoscopic effect. The user selects one of images recorded in the recording medium 57 (step S501). Alternatively, the display device 50a may select any one of the images recorded in the recording medium 57. The stereoscopic image generating unit 59 generates a stereoscopic image based on the selected image, and the display processing unit 61 displays the stereoscopic image on the display monitor 51. If a parallax control value has already been associated with the image selected in step S501 and recorded, the stereoscopic effect control unit 58 may read out the recorded parallax control value from the recording medium 57 and set the parallax control value for the stereoscopic image generating unit 59.

The stereoscopic effect control unit 58 controls the stereoscopic effect of the image selected in step S501 (step S502). The stereoscopic image generating unit 59 generates the stereoscopic image with the parallax controlled by the stereoscopic effect control unit 58. The display processing unit 61 displays the stereoscopic image on the display monitor 51 (step S503). When the user instructs to redo the control, the stereoscopic effect control unit 58 may cancel the control made so far and return the parallax control value to the initial state.

The stereoscopic effect control unit 58 determines whether or not the user has instructed to end the control (step S504). If the user has not instructed to end the control, the process returns to step S502, and the stereoscopic effect control is continued. If the user has instructed to end the control, the monitor size obtaining unit 62 obtains the monitor size of the display monitor 51 (step S505). These steps may be the same as steps S101 to S105 shown in FIG. 4.

The parameter calculation unit 63 calculates the parameters of the estimation formula based on the controlled parallax control value and the monitor size obtained in step S505 (step S506). In step S506, the parameter calculation unit 63 may read out the parallax control value and the monitor size of a previous stereoscopic effect control from the recording medium 57, and may calculate the parameters of the estimation formula using the read out parallax control value and monitor size. For example, it is assumed that the parallax control value of the current stereoscopic effect control is y1 and the monitor size of the current stereoscopic effect control is x1, and the parallax control value of the previous stereoscopic effect control is y2 and the monitor size of the previous stereoscopic effect control is x2. In this case, the parameter calculation unit 63 finds a straight line connecting a point (x1, y1) and a point (x2, y2), and uses the inclination and the y-intercept of the straight line as the parameters of the estimation formula.

The control value recording unit 60 associates the parameters of the estimation formula calculated in step S506 with the image selected in step S501 and records them (step S507). At this time, the control value recording unit 60 may further associate the controlled parallax control value and the monitor size with the image and record them.

In the case where the linear expression is used as the estimation formula, parallax control values which are controlled with at least two monitor sizes are necessary to calculate the inclination a and the intercept b. During the first stereoscopic effect control, the inclination a and the intercept b cannot be calculated since there is no parallax control value of a previous stereoscopic effect control. During the first control, step S506 may be skipped, and the parallax control value and the monitor size may be associated with the image and recorded in step S507. Alternatively, an initial value of one of the parameters, such as the inclination a, may be determined in advance, and the intercept b may be calculated in step S506 based on the parallax control value, the monitor size and the initial value of the inclination. Then, the inclination a (initial value) and the calculated intercept b may be associated with the image and recorded in step S507.

Figure 14:
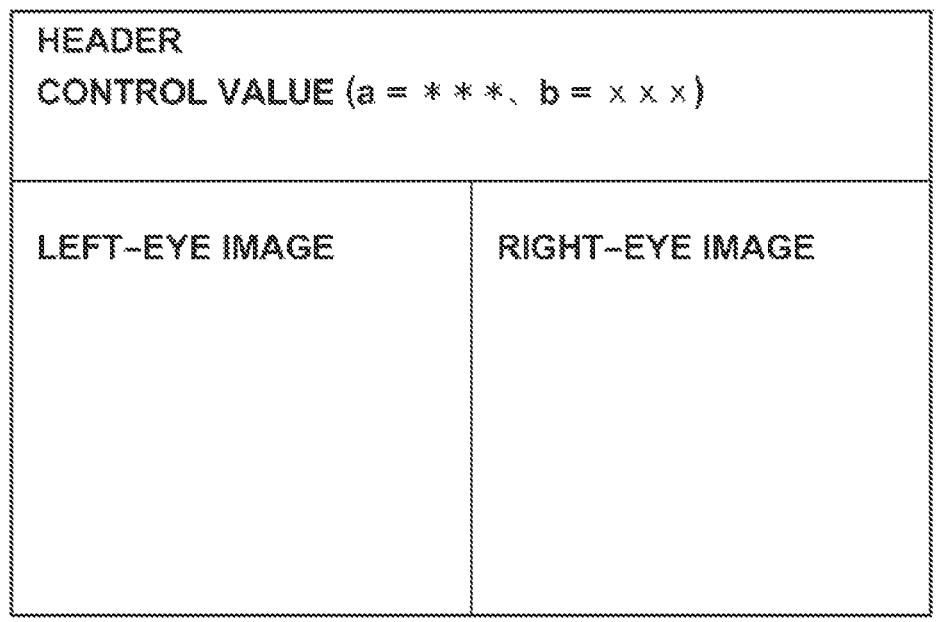
FIG. 14 illustrates images and parameters that are associated with the images and recorded.

FIG. 14 illustrates images and parameters that are associated with the images and recorded. In this example, the control value recording unit 60 records, in the header of the file, values of the inclination a and the intercept b as the parameters of the estimation formula, for example. In a case where initial values are set for the parameters of the estimation formula, the parameters to be recorded may be represented by differences from the initial values, respectively.

It should be noted that the images may be stored in any manner. For example, the left-eye image and the right-eye image may be stored in separate files, as shown in FIG. 7A. The association between the image and the parallax control values may be achieved in any manner. For example, the parallax control value may be managed in a separate file from the image file, as shown in FIGS. 7B to 7D.

Figure 15:
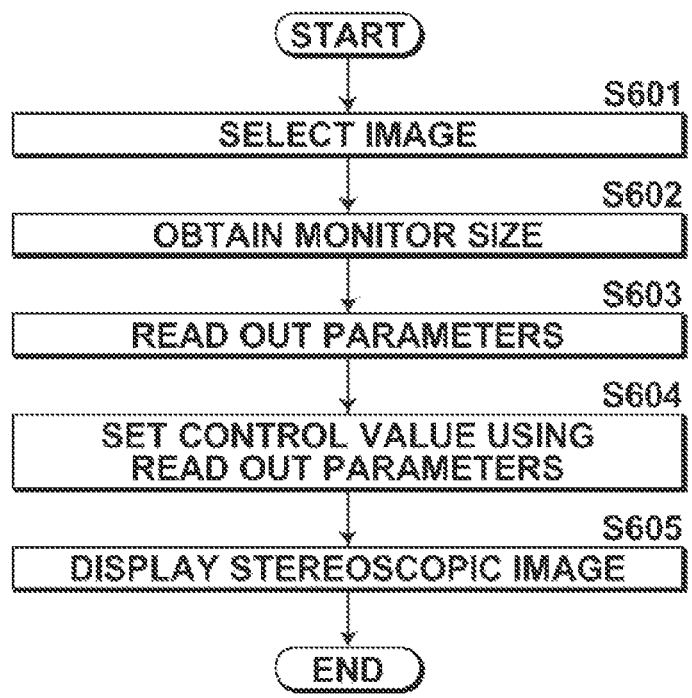
FIG. 15 is a flowchart illustrating a process for displaying an image according to the third embodiment.

FIG. 15 illustrates a process for displaying the image. The user selects one of images recorded in the recording medium 57 (step S601). Alternatively, the display device 50a may select any one of the images recorded in the recording medium 57. The monitor size obtaining unit 62 obtains the monitor size of the display monitor 51 (step S602).

The stereoscopic effect control unit 58 reads out the parameters of the estimation formula recorded with being associated with the image selected in step S601 from the recording medium 57 (step S603). The stereoscopic effect control unit 58 calculates a parallax control value from the read out parameters and the monitor size obtained in step S602 (step S604). For example, the stereoscopic effect control unit 58 reads out, as the parameters of the estimation formula, the inclination a and the intercept b, and calculates, as the parallax control value, a value resulting from aX+b, where X is the obtained monitor size.

The stereoscopic effect control unit 58 sets the parallax control value calculated in step S604 for the stereoscopic image generating unit 59. The stereoscopic image generating unit 59 generates a stereoscopic image according to the set parallax control value. The display processing unit 61 displays the stereoscopic image on the display monitor 51 (step S605).

In this embodiment, when the stereoscopic effect is controlled, the parameters of the estimation formula for estimating the parallax control value based on the monitor size are associated with the image and recorded. When the image is displayed, the parameters of the estimation formula are read out, and the read out parameters and the monitor size obtained by the monitor size obtaining unit 62 are used to estimate a parallax control value corresponding to the obtained monitor size. In this manner, the image can be displayed with a stereoscopic effect preferred by the user even on a display monitor of a size for which the stereoscopic effect control has not yet been performed.

Figure 16:
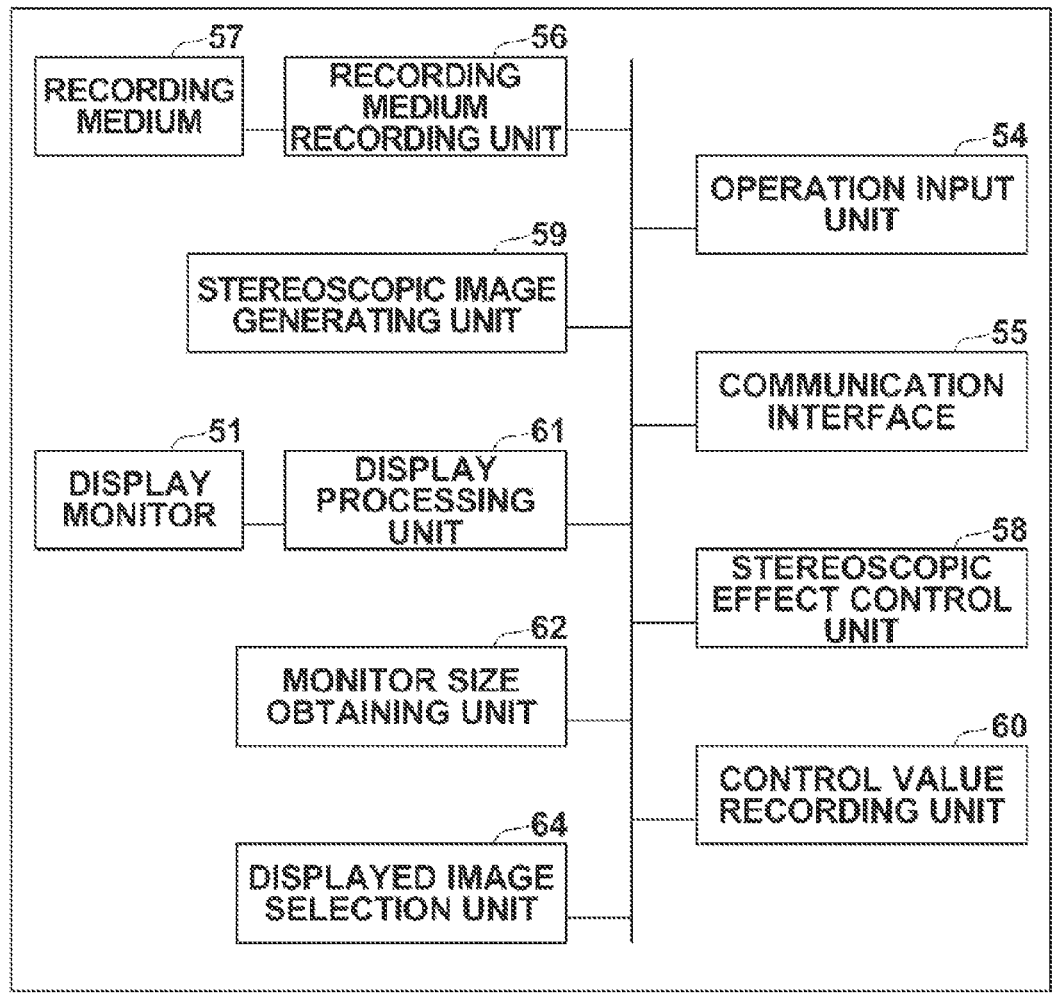
FIG. 16 is a block diagram illustrating the internal configuration of a stereoscopic imaging device according to a fourth embodiment of the invention.

Next, a fourth embodiment of the invention is described. FIG. 16 illustrates the internal configuration of a display device according to the fourth embodiment. The display device 50b may have the same appearance as that of the display device 50 of the first embodiment shown in FIG. 1. The display device 50b of this embodiment includes a displayed image selection unit 64 in addition to the configuration of the display device 50 of the first embodiment shown in FIG. 2. The displayed image selection unit 64 selects a multi-viewpoint image to be displayed from the multi-viewpoint images recorded in the recording medium 57.

In this embodiment, when the image is displayed, the stereoscopic effect control unit 58 reads out, from the recording medium 57, one or more parallax control values recorded with being associated with the multi-viewpoint image selected as the image to be displayed, and sets the parallax control values for the stereoscopic image generating unit 59. The stereoscopic image generating unit 59 generates, based on the selected multi-viewpoint image, one or more stereoscopic images with stereoscopic effects represented by the one or more parallax control values read out by the stereoscopic effect control unit 58, respectively.

The parallax control value read out by the stereoscopic effect control unit 58 may be a parallax control value corresponding to the monitor size obtained by the monitor size obtaining unit 62. For example, when there are five parallax control values recorded with being associated with a certain image, and three of them are parallax control values corresponding to the same monitor size as that of the display monitor 51, the stereoscopic effect control unit 58 reads out the three parallax control values. Alternatively, the stereoscopic effect control unit 58 may read out a parallax control value corresponding to a monitor size that is similar to the monitor size of the display monitor 51, such as a parallax control value corresponding to a monitor size within a predetermined range of difference from the obtained monitor size. Still alternatively, the stereoscopic effect control unit 58 may read out all the recorded parallax control values recorded with being associated with the image regardless of the monitor size to which each parallax control value corresponds. As described with respect to the second embodiment, when the factors are recorded together with the parallax control value, a value which is obtained by multiplying the parallax control value with one of the factors corresponding to the monitor size of the display monitor 51 may be set for the stereoscopic image generating unit 59.

The display processing unit 61 displays the generated one or more stereoscopic images sequentially on the display monitor 51. When two or more images are selected to be displayed, and two or more parallax control value are associated with one multi-viewpoint image, the display processing unit 61 sequentially displays the stereoscopic images of the one multi-viewpoint image generated according to the parallax control values, and then displays the stereoscopic image of the next multi-viewpoint image.

Figure 17:
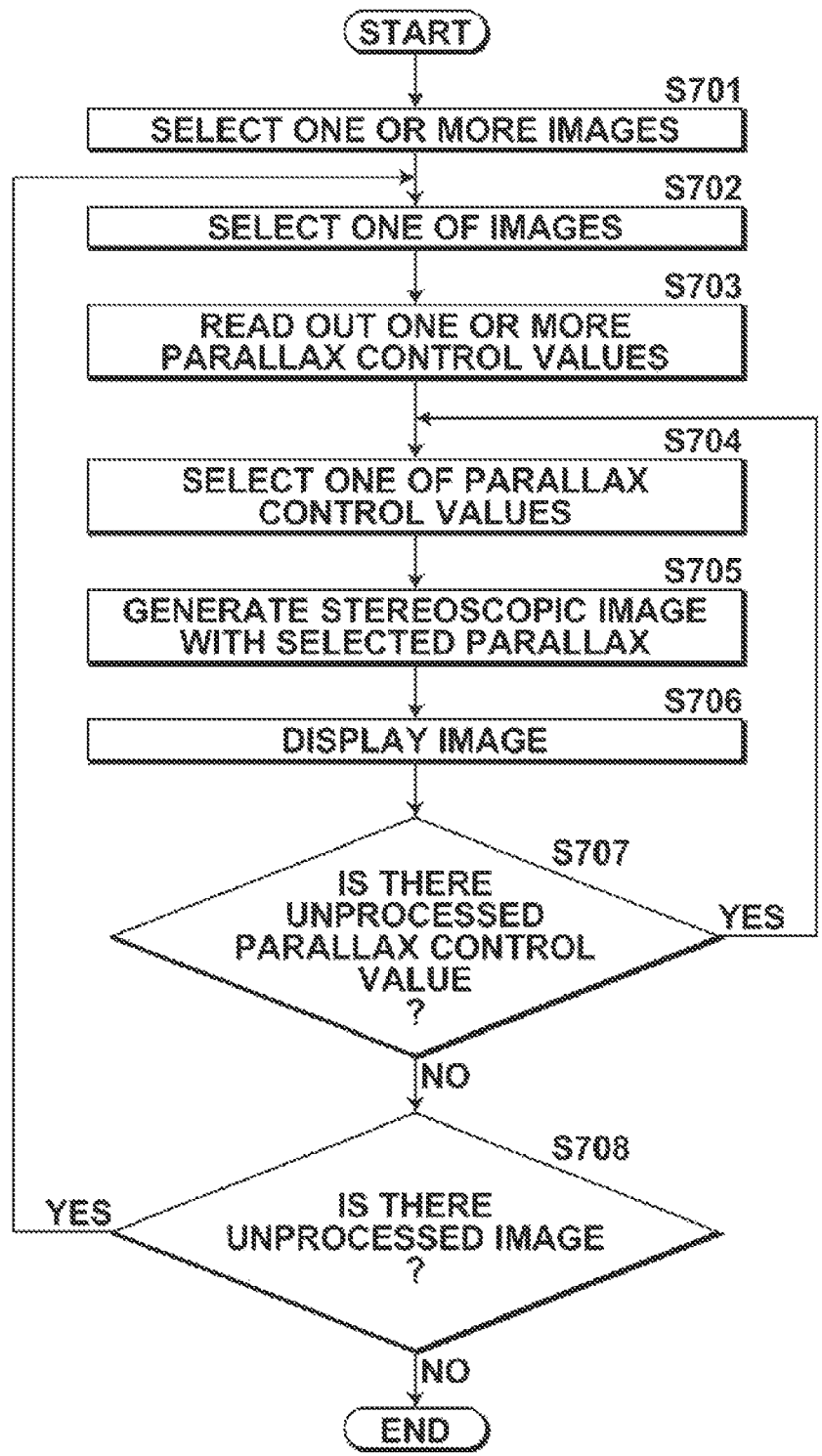
FIG. 17 is a flowchart illustrating a process for displaying a stereoscopic image according to the fourth embodiment.

FIG. 17 illustrates a process for displaying the stereoscopic image. The displayed image selection unit 64 selects one or more images from images recorded in the recording medium 57 as an image (s) to be displayed (step S701). The displayed image selection unit 64 may display, for example, a list of the images recorded in the recording medium 57 on the display monitor 51 via the display processing unit 61, so that the user selects an image to be displayed. The user can select the images in the list one by one by operating the operation button 52 (FIG. 1), or the like. Alternatively, one or more images in a folder may be selected at once by selecting the folder. In step S701, the user may specify, for example, a category, photographing time and date, or the like, to search for an image through the recording medium 57, and may select the searched out image. The selection of the image may be performed by the user, or may be automatically performed by the displayed image selection unit 64. For example, the displayed image selection unit 64 may automatically and randomly select one or more images from the images recorded in the recording medium 57.

The stereoscopic effect control unit 58 selects one of the one or more images selected in step S701 (step S702). The stereoscopic effect control unit 58 reads out the one or more parallax control values recorded with being associated with the image selected in step S702 (step S703). In the case where the parallax control values are recorded in the header of the image file, as in the examples shown in FIGS. 5 and 7A, the stereoscopic effect control unit 58 reads out the parallax control values from the header of the image file of the image selected in step S702. Alternatively, in the case where the parallax control values are recorded in the file separate from the image file, as in the examples shown in FIGS. 7B to 7D, the stereoscopic effect control unit 58 reads out the parallax control values associated with the image selected in step S702 from the parallax control value recording file for recording the parallax control values of the image.

The stereoscopic effect control unit 58 selects one of the read out parallax control values (step S704). The stereoscopic effect control unit 58 sets the selected parallax control value for the stereoscopic image generating unit 59. The stereoscopic image generating unit 59 generates a stereoscopic image with a parallax according to the selected parallax control value (step S705). The display processing unit 61 displays the stereoscopic image generated by the stereoscopic image generating unit 59 on the display monitor 51 (step S706).

The stereoscopic effect control unit 58 determines whether or not there is an unprocessed parallax control value among the read out parallax control values (step S707). If it is determined that there is an unprocessed parallax control value, the process returns to step S704, and the stereoscopic effect control unit 58 selects one of the unprocessed parallax control value (s). Then, in step S705, the stereoscopic image generating unit 59 generates a stereoscopic image with a parallax according to the selected parallax control value. In step S706, the display processing unit 61 displays the stereoscopic image on the display monitor 51. The display device 50b repeats the operations in steps S704 to S706 for each of the read out parallax control values, and displays the image according to each of the read out parallax control values on the display monitor 51.

If it is determined that there is no unprocessed parallax control value in step S707, the stereoscopic effect control unit 58 determines whether or not there is an unprocessed image among the images selected as the images to be displayed in step S701 (step S708). If it is determined that there is an unprocessed image, the process returns to step S702, and the stereoscopic effect control unit 58 selects one of the unprocessed image (s). Then, the operations in step S703 to S706 are performed on the selected image, and the image according to each of the parallax control values recorded with being associated with the selected image is displayed. If it is determined in step S708 that there is no unprocessed image, the process ends.

Figure 18A:
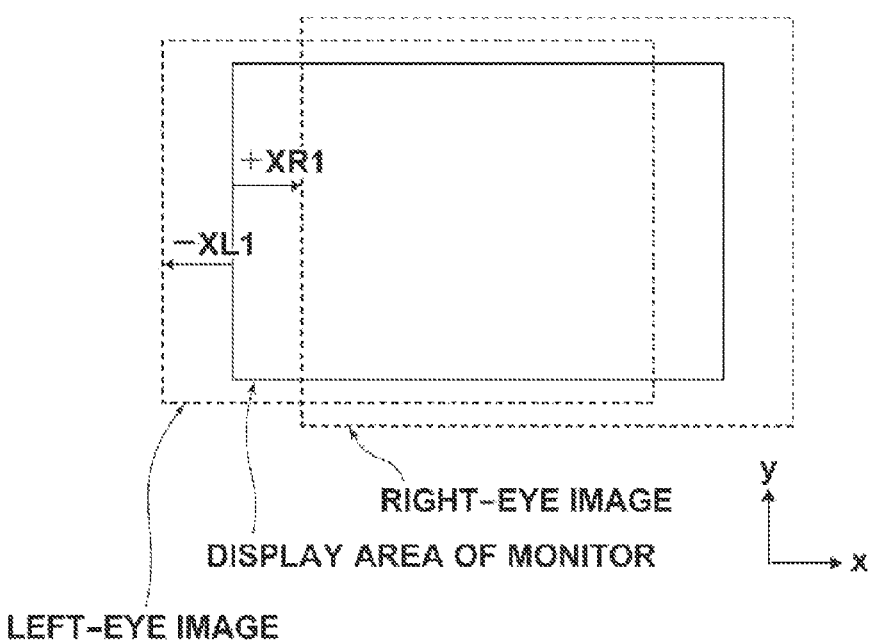
FIG. 18A is a schematic diagram illustrating a stereoscopic image displayed on a display monitor.
Figure 18B:
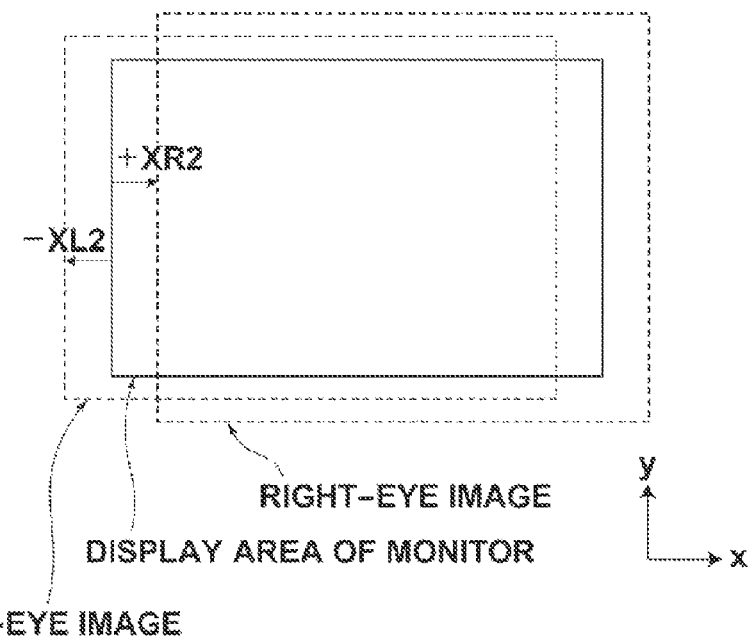
FIG. 18B is a schematic diagram illustrating a stereoscopic image displayed on a display monitor.
Figures 18C, 19:
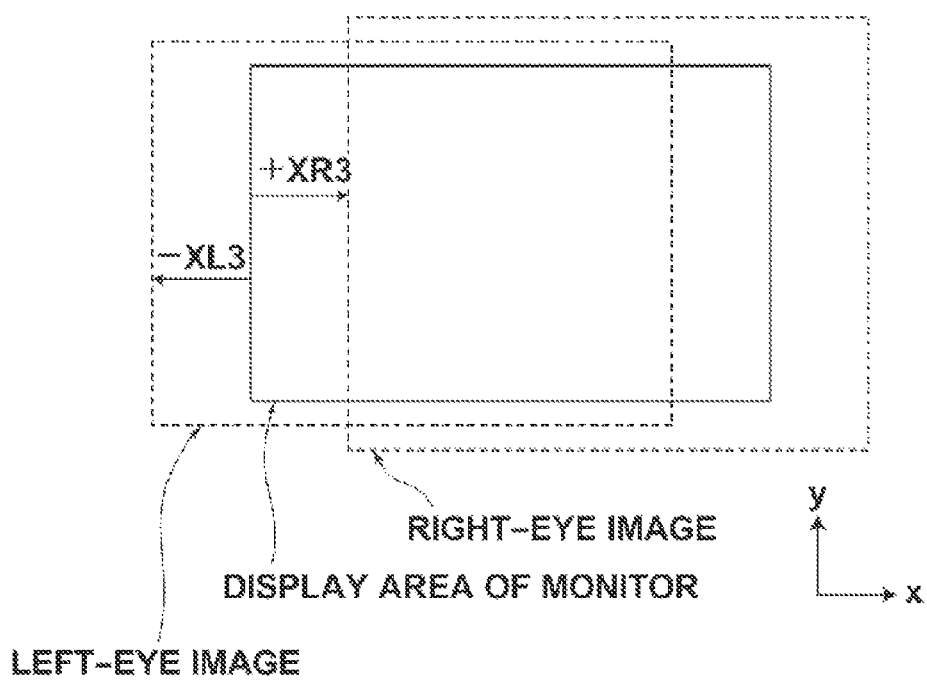
FIG. 18C is a schematic diagram illustrating a stereoscopic image displayed on a display monitor.
FIG. 19 illustrates a specific example of a parallax control value recording file.

FIGS. 18A to 18C illustrate an image displayed on the display monitor 51. In this example, a case where three parallax control values are associated with a certain image and recorded is described. It is assumed that the first one of the parallax control values is a parallax control value that has been automatically controlled by the stereoscopic effect control unit 58 based on the right-eye image and the left-eye image, and the remaining two parallax control values are parallax control values that have been arbitrarily controlled by the user. The automatically-controlled control value is referred to as "control value 1" and the user-controlled control values are referred to as "control value 2" and "control value 3", respectively. It is assumed that these control values have been controlled using the display device 50b or a display device having the same monitor size as that of the display monitor 51 of the display device 50b.

FIG. 18A illustrates an example where the image is displayed according to the "control value 1". It is assumed that the stereoscopic effect control unit 58 has read out the three control values in step S702 and has selected the "control value 1" first in step S703. In step S704, the stereoscopic image generating unit 59 generates a stereoscopic image by shifting the right-eye image rightward relative to the plane of the drawing by an amount of XR1 from a position corresponding to the parallax of 0 and shifting the left-eye image leftward relative to the plane of the drawing by an amount of XL1 from a position corresponding to the parallax of 0. In step S705, the stereoscopic image formed from the right-eye image and the left-eye image which are offset from each other according to the control values thereof, as shown in FIG. 18A, is displayed on the display monitor 51.

FIG. 18B illustrates an example where the image is displayed according to the "control value 2". In step S706, it is determined that there is an unprocessed control value, and the process returns to step S703, where the stereoscopic effect control unit 58 selects the "control value 2". In step S704, the stereoscopic image generating unit 59 generates a stereoscopic image by shifting the right-eye image rightward relative to the plane of the drawing by an amount of XR2 from the position corresponding to the parallax of 0 and shifting the left-eye image leftward relative to the plane of the drawing by an amount of XL2 from the position corresponding to the parallax of 0. In step S705, the stereoscopic image formed from the right-eye image and the left-eye image which are offset from each other according to the control values thereof, as shown in FIG. 18B, is displayed on the display monitor 51.

FIG. 18C illustrates an example where the image is displayed according to the "control value 3". In step S706, it is determined that there is an unprocessed control value, and the process returns to step S703, where the stereoscopic effect control unit 58 selects the "control value 3". In step S704, the stereoscopic image generating unit 59 generates a stereoscopic image by shifting the right-eye image rightward relative to the plane of the drawing by an amount of XR3 from the position corresponding to the parallax of 0 and shifting the left-eye image leftward relative to the plane of the drawing by an amount of XL3 from the position corresponding to the parallax of 0. In step S705, the stereoscopic image formed from the right-eye image and the left-eye image which are offset from each other according to the control values thereof, as shown in FIG. 18C, is displayed on the display monitor 51.

It is assumed that a parallax (XR2+XL2) according to the "control value 2" is slightly smaller than a parallax (XR1+XL1) according to the "control value 1". In contrast, a parallax (XR3+XL3) according to the "control value 3" is slightly larger than the parallax (XR1+XL1) according to the "control value 1". In a case where each parallax control value is represented by a difference from the "control value 1", the parallax control value of the right-eye image according to the "control value 2" is a negative value ($\Delta$XR2<0), and the parallax control value of the left-eye image is a positive value ($\Delta$XL2>0). On the other hand, the parallax control value of the right-eye image according to the "control value 3" is a positive value ($\Delta$XR3>0), and the parallax control value of the left-eye image is a negative value ($\Delta$XL3<0). The "control value 3" provides the strongest stereoscopic effect, the "control value 1" provides the next strongest stereoscopic effect, and the "control value 2" provides the weakest stereoscopic effect among them.

The user can arbitrarily select one of the control values that provides a stereoscopic effect most preferred by the user while viewing the displayed images. For example, if the user prefers a display with a strong stereoscopic effect, the user may select the "control value 3". If the user prefers a display with a weak stereoscopic effect, the user may select the "control value 2". If the user prefers a display with an intermediate stereoscopic effect, the user may select the "control value 1". Further, if the user feels that none of the control values provide an appropriate stereoscopic effect, the user can control the stereoscopic effect and record another parallax control value.

FIG. 19 illustrates a specific example of the parallax control value recording file. It is assumed that the parallax control value recording file (parallax control value.txt) records the parallax control values corresponding to the images stored in the image storage folder, as in the example shown in FIG. 7B. It is assumed that the image storage folder stores three images including an image A, an image B and an image C, and the parallax control value recording file records three parallax control values including a control value 1-1 a control value 1-2 and a control value 1-3 for the image A, a control value 2 as the parallax control value for the image B, and two parallax control values including a control value 3-1 and a control value 3-2 for the image C. It is assumed that these control values correspond to a monitor size of 3 inches. Although not shown in FIG. 19, the parallax control value recording file may also record parallax control values corresponding to monitor sizes other than the monitor size of 3 inches.

Figure 20:
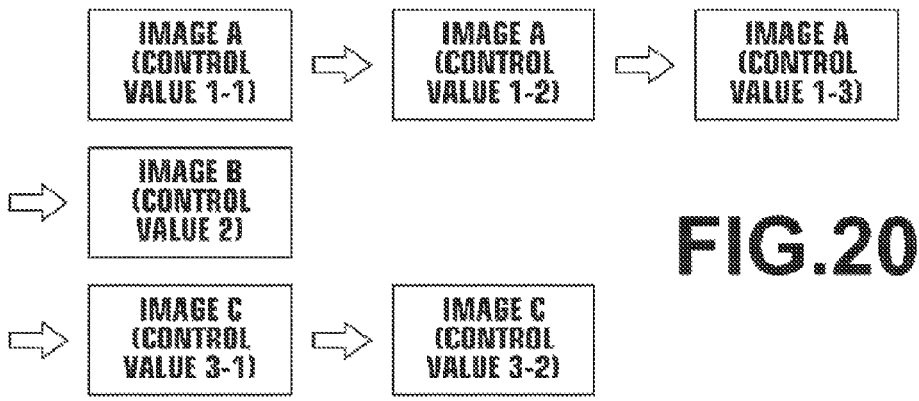
FIG. 20 is a block diagram illustrating the display order of images in the fourth embodiment.

FIG. 20 illustrates the display order of images. It is assumed that the monitor size of the display monitor 51 is 3 inches. It is assumed that the displayed image selection unit 64 has selected, in step S701, images in a folder in which the parallax control value file is present, as shown in FIG. 19, namely, the image A, the image B and the image C, as the images to be displayed. In step S702, the stereoscopic effect control unit 58 selects the image A. In step S703, the stereoscopic effect control unit 58 reads out, from the parallax control value recording file shown in FIG. 19, the parallax control values (the control value 1-1, the control value 1-2 and the control value 1-3) recorded for the image A and corresponding to the monitor size of 3 inches.

In step S704, the stereoscopic effect control unit 58 selects the control value 1-1 from the read out parallax control values. In step S705, the stereoscopic image generating unit 59 generates a stereoscopic image of the image A with a parallax according to the control value 1-1. In step S706, the display processing unit 61 displays the stereoscopic image of the image A according to the control value 1-1 on the display monitor 51. Since there still remain control values other than the control value 1-1 among the parallax control values for the image A, the process returns from step S707 to step S703.

In step S703, the stereoscopic effect control unit 58 selects the control value 1-2. Through steps S705 and S706, a stereoscopic image of the image A with a parallax according to the control value 1-2 is displayed on the display monitor 51. The stereoscopic effect control unit 58 checks whether or not there is an unprocessed parallax control value among the parallax control values for the image A. Since the control value 1-3 has not yet been processed, the process returns from step S707 to step S703. In step S703, the stereoscopic effect control unit 58 selects the control value 1-3. Through steps S705 to S706, a stereoscopic image of the image A with a parallax according to the control value 1-3 is displayed on the display monitor 51.

After the stereoscopic image of the image A according to the control value 1-3 is displayed, the stereoscopic effect control unit 58 determines in step S706 that there is no unprocessed parallax control value for the image A. In step S707, the stereoscopic effect control unit 58 determines that there is an unprocessed image, and the process returns to step S702, where the image B is selected. In step S703, the stereoscopic effect control unit 58 reads out the parallax control value (according to the control value 2) recorded for the image B corresponding to the monitor size of 3 inches from the parallax control value recording file shown in FIG. 19.

In step S704, the stereoscopic effect control unit 58 selects the control value 2. In step S705, the stereoscopic image generating unit 59 generates a stereoscopic image of the image B with setting a parallax according to the control value 2. In step S706, the display processing unit 61 displays the stereoscopic image of the image B according to the control value 2 on the display monitor 51. Since the parallax control value for the image B is only the control value 2, the stereoscopic effect control unit 58 determines that there is no unprocessed parallax control value. In step S707, the stereoscopic effect control unit 58 determines that there is an unprocessed image, and the process returns to step S702, where the image C is selected.

In step S703, the stereoscopic effect control unit 58 reads out the parallax control values (the control value 3-1 and the control value 3-2) recorded for the image C corresponding to the monitor size of 3 inches from the parallax control value recording file shown in FIG. 19. In step S704, the stereoscopic effect control unit 58 selects one of the read out parallax control values. Through steps S705 to S706, a stereoscopic image of the image C with a parallax according to the control value 3-1 is displayed. Since the parallax control values for the image C include a control value other than the control value 3-1, the stereoscopic effect control unit 58 returns from step S707 to step S703.

In step S703, the stereoscopic effect control unit 58 selects the control value 3-2. Through steps S705 to S706, a stereoscopic image of the image C with a parallax according to the control value 3-2 is displayed on the display monitor 51. In step S707, the stereoscopic effect control unit 58 determines that there is no unprocessed parallax control value. In step S707, the stereoscopic effect control unit 58 checks whether or not there is an unprocessed image. Since there is not unprocessed image, the process ends. As a result, as shown in FIG. 20, the image A (according to the control value 1-1), the image A (according to the control value 1-2), the image A (according to the control value 1-3), the image B (according to the control value 2), the image C (according to the control value 3-1) and the image C (according to the control value 3-2) are displayed in this order on the display monitor 51.

In this embodiment, in the case where two or more parallax control values are recorded for an image selected as the image to be displayed, the stereoscopic image generating unit 59 generates a stereoscopic image using each of the parallax control values, and the generated stereoscopic images are sequentially displayed on the display monitor 51. In this manner, the user can select a parallax control value that provides a stereoscopic effect preferred by the user from the parallax control values recorded with being associated with the image.

Next, a fifth embodiment of the invention is described. The internal configuration of the stereoscopic image display device of this embodiment is the same as the internal configuration of the display device 50b shown in FIG. 16. Similarly to the fourth embodiment, when two or more parallax control values are read out, the stereoscopic image generating unit 59 of this embodiment generates a stereoscopic images with a parallax according to each of the parallax control values. In this embodiment, the display order of the stereoscopic images generated with the different parallaxes is different from the display order in the fourth embodiment. In this embodiment, the display processing unit 61 sequentially displays stereoscopic images generated according to the i-th parallax control values (where i=1 to the number of the parallax control values) of the multi-viewpoint images, and then displays stereoscopic images generated according to the (i+1)-th parallax control values of the multi-viewpoint images.

Figure 21:
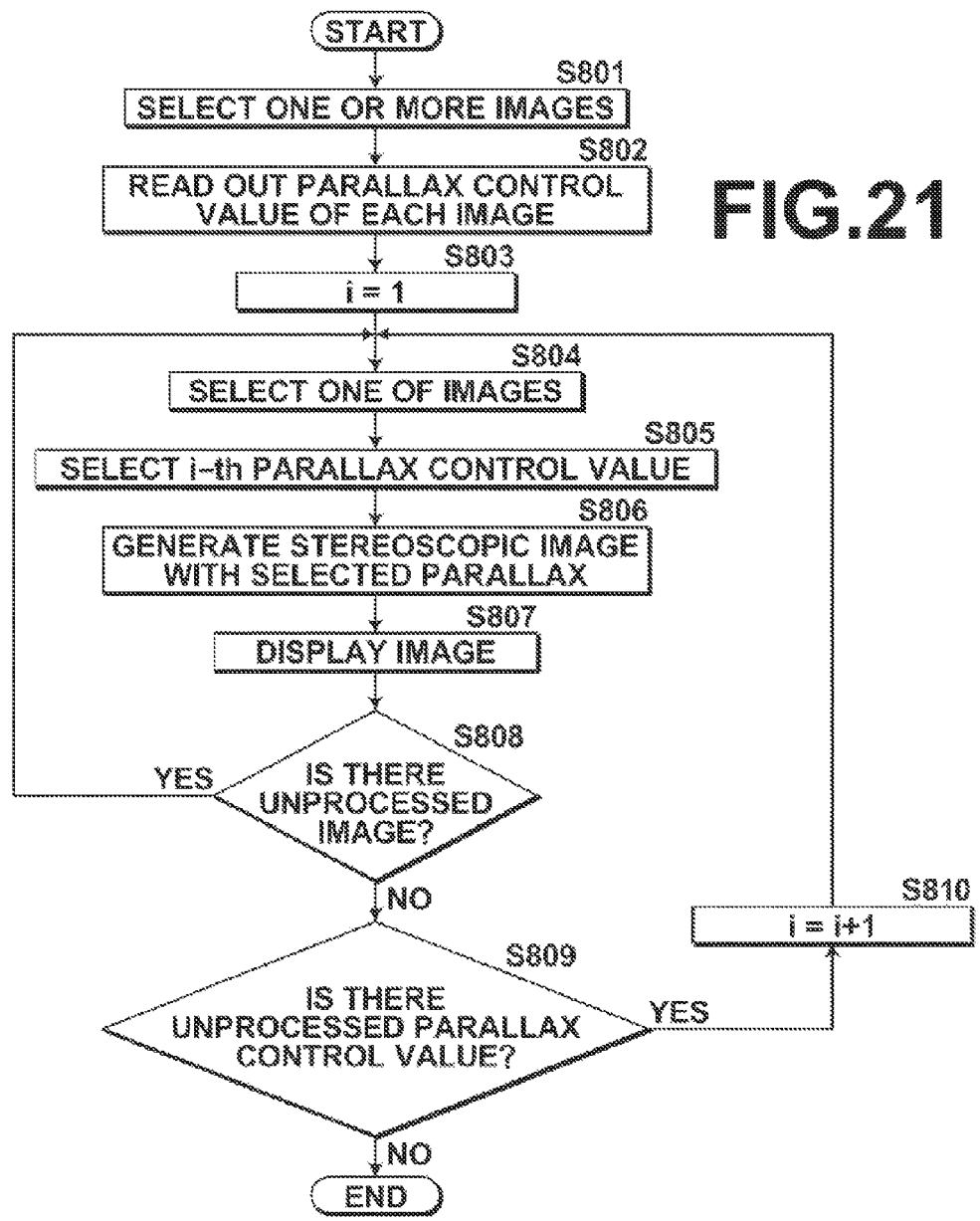
FIG. 21 is a flowchart illustrating a process for displaying a stereoscopic image according to a fifth embodiment of the invention.

FIG. 21 illustrates a process for displaying the stereoscopic images. The displayed image selection unit 64 selects one or more images from images recorded in the recording medium 57 as an image(s) to be displayed (step S801). Step S801 may be the same as step S701 shown in FIG. 17. In step S801, in place of selecting the images by the user, the displayed image selection unit 64 may randomly select one or more images from the images recorded in the recording medium 57.

The stereoscopic effect control unit 58 reads out one or more parallax control values recorded with being associated with each of the images selected in step S801 (step S802). In step S802, the stereoscopic effect control unit 58 reads out the parallax control values corresponding to the monitor size of the display monitor 51. Alternatively, the parallax control values read out by the stereoscopic effect control unit 58 may include parallax control values corresponding to monitor sizes different from the monitor size of the display monitor 51. In a case where the factors are recorded in addition to each parallax control value, a value obtained by multiplying the parallax control value with one of the factors may be set as the parallax control value.

The stereoscopic effect control unit 58 initializes the variable i to i=1 (step S803). The stereoscopic effect control unit 58 selects one of the one or more images selected in step S801 (step S804). The stereoscopic effect control unit 58 selects the i-th parallax control value recorded with being associated with the image selected in step S804 (step S805). The stereoscopic effect control unit 58 sets the i-th parallax control value for the stereoscopic image generating unit 59. The stereoscopic image generating unit 59 generates a stereoscopic image with a parallax according to the i-th parallax control value based on the multi-viewpoint image selected in step S804 (step S806). The display processing unit 61 displays the stereoscopic image generated by the stereoscopic image generating unit 59 on the display monitor 51 (step S807).

The stereoscopic effect control unit 58 determines whether or not there is an unprocessed image in the images selected in step S801 as the images to be displayed (step S808). If it is determined in step S808 that there is an unprocessed image, the process returns to step S804, and the stereoscopic effect control unit 58 selects one of the unprocessed images. Then, in step S805, the stereoscopic effect control unit 58 selects the i-th parallax control value of the selected image. In step S806, the stereoscopic image generating unit 59 generates a stereoscopic image with a parallax according to the i-th parallax control value of the selected image. In step S807, the display processing unit 61 displays the stereoscopic image on the display monitor 51. The display device repeats the operations in steps S804 to S807 until there is no unprocessed image, and displays each stereoscopic image according to the i-th parallax control value on the display monitor 51.

If it is determined in step S808 that there is no unprocessed image, the stereoscopic effect control unit 58 determines whether or not there is an unprocessed parallax control value among the parallax control values readout in step S802 (step S809). In other words, the stereoscopic effect control unit 58 determines whether or not there is the (i+1)-th parallax control value for at least one of the multi-viewpoint images. If there is an unprocessed parallax control value, the stereoscopic effect control unit 58 increments the variable i (step S810). Then, the process returns to step S804, and the operations in steps S804 to S807 are repeated until there is no unprocessed image. Then, each stereoscopic image according to the i-th parallax control value is displayed on the display monitor 51. If it is determined in step S809 that there is no unprocessed parallax control value, the display device ends the process.

Figure 22:
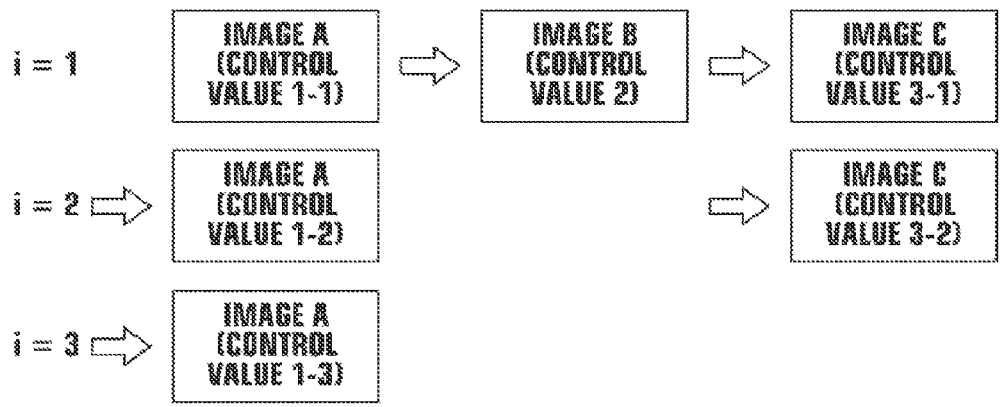
FIG. 22 is a block diagram illustrating the display order of images in the fifth embodiment.

FIG. 22 illustrates the display order of the images. It is assumed that the monitor size of the display monitor 51 is 3 inches. It is assumed that the displayed image selection unit 64 has selected, in step S801, images in a folder in which the parallax control value file is present, as shown in FIG. 19, namely, the image A, the image B and the image C, as the images to be displayed. The stereoscopic effect control unit 58 reads out, from the parallax control value file shown in FIG. 19, the parallax control values including the control value 1-1, the control value 1-2, the control value 1-3, the control value 2, the control value 3-1 and the control value 3-2 corresponding to the monitor size of 3 inches for the images B and C, respectively.

The stereoscopic effect control unit 58 manages the readout control values by providing each control value with a unique number corresponding to each image. For example, with respect to the image A, the control value 1-1 is the first parallax control value, the control value 1-2 is the second parallax control value, and the control value 1-3 is the third parallax control value. With respect to the image B, the control value 2 is the first parallax control value. With respect to the image C, the control value 3-1 is the first parallax control value and the control value 3-2 is the second parallax control value. In step S803, the stereoscopic effect control unit 58 initializes the variable i to i=1.

The stereoscopic effect control unit 58 selects the image A in step S804, and selects the first parallax control value (the control value 1-1) of the image A in step S805. In step S806, the stereoscopic image generating unit 59 sets a parallax according to the control value 1-1 to generate a stereoscopic image of the image A. In step S807, the display processing unit 61 displays the stereoscopic image of the image A according to the control value 1-1 on the display monitor 51. In step S808, the stereoscopic effect control unit 58 determines that there is an unprocessed image. Then, the process returns to step S804, where the image B is selected.

In step S805, the stereoscopic effect control unit 58 selects the first parallax control value (the control value 2) of the image B. Through steps S806 and S807, a stereoscopic image of the image B according to the control value 2 is displayed on the display monitor 51. In step S808, the stereoscopic effect control unit 58 checks whether or not there is an unprocessed image. Since the image C has not yet been processed, the process returns to step S804. In step S804, the stereoscopic effect control unit 58 selects the image C, and selects the first parallax control value (the control value 3-1) of the image C in step S805. Through steps S806 and S807, a stereoscopic image of the image C with a parallax according to the control value 3-1 is displayed on the display monitor 51.

In step S808, the stereoscopic effect control unit 58 determines that there is no unprocessed image, and the process proceeds to step S809. In step S809, the stereoscopic effect control unit 58 checks whether or not there is an unprocessed parallax control value. Since there are unprocessed parallax control values of the image A and the image C, the process proceeds from step S809 to step S810, and the stereoscopic effect control unit 58 increments the value of the variable i by one to i=2. Then, the process returns to step S804, and the stereoscopic effect control unit 58 selects the image A. After the variable i is incremented, the stereoscopic effect control unit 58 may list images having the i-th parallax control value among the images selected in step S801, and may select one of the images in the list in step S804.

In step S805, the stereoscopic effect control unit 58 selects the second parallax control value (the control value 1-2) of the image A. Through steps S806 and S807, a stereoscopic image of the image A with a parallax according to the control value 1-2 is displayed on the display monitor 51. In step S808, the stereoscopic effect control unit 58 checks whether or not there is an unprocessed image. Since the image C has not yet been processed, the process returns to step S804. In step S804, the stereoscopic effect control unit 58 selects the image C, and selects the second parallax control value (the control value 3-2) of the image C in step S805. Since the image B does not have the second parallax control value, the image B is not included in the list for the selection in step S804. Through steps S806 and S807, a stereoscopic image of the image C with a parallax according to the control value 3-2 is displayed on the display monitor 51. In step S808, the stereoscopic effect control unit 58 checks whether or not there is an unprocessed image. Since there is no unprocessed image, the process proceeds to step S809.

In step S809, the stereoscopic effect control unit 58 checks whether or not there is an unprocessed parallax control value. Since there is an unprocessed parallax control value of the image A, the process proceeds from step S809 to step S810, and the stereoscopic effect control unit 58 increments the value of the variable i by one to i=3. Then, the process returns to step S804, where the stereoscopic effect control unit 58 selects the image A. In step S805, the stereoscopic effect control unit 58 selects the third parallax control value (the control value 1-3) of the image A. Since the image C does not have the third parallax control value, the image C is not included in the list for the selection in step S804. Through steps S806 and S807, a stereoscopic image of the image A with a parallax according to the control value 1-3 is displayed on the display monitor 51. In step S808, the stereoscopic effect control unit 58 checks whether or not there is an unprocessed image. Since there is no unprocessed image, the process proceeds to step S809.

In step S809, the stereoscopic effect control unit 58 checks whether or not there is an unprocessed parallax control value. Since all the parallax control values read out in step S802 have been selected, the stereoscopic effect control unit 58 determines that there is no unprocessed parallax control value, and the process ends. As a result, as shown in FIG. 22, the image A (according to the control value 1-1), the image B (according to the control value 2), the image C (according to the control value 3-1), the image A (according to the control value 1-2), the image C (according to the control value 3-2) and the image A (according to the control value 1-3) are displayed in this order on the display monitor 51. In this embodiment, the user can select a parallax control value that provides a stereoscopic effect preferred by the user from the parallax control values recorded with being associated with the image, similarly to the fourth embodiment.

In the fourth and fifth embodiments, the images may be displayed in the order of the intensity of the stereoscopic effect from the weakest. For example, in the fourth embodiment, the one or more parallax control values readout in step S703 shown in FIG. 17 may be sorted in the order of the intensity of the stereoscopic effect from the weakest, and each parallax control value may be selected in the order of the intensity of the stereoscopic effect from the weakest in step S704, so that the stereoscopic images of the same image are displayed in the order of the intensity of the stereoscopic effect from the weakest. In the fifth embodiment, the parallax control values of each image read out in step S802 shown in FIG. 21 may be sorted in the order of the intensity of the stereoscopic effect from the weakest for each image, and each parallax control value may be selected in the order of the intensity of the stereoscopic effect from the weakest in step S805. Displaying the images in the order of the intensity of the stereoscopic effect from the weakest is effective to reduce a burden on the eyes of the user viewing the images.

Alternatively, in the fourth embodiment, the parallax control values of all the images to be displayed may be sorted in the order of the intensity of the stereoscopic effect from the weakest to display the images in this order. For example, the parallax control values of each image to be displayed are sorted in the order of the intensity of the stereoscopic effect from the weakest, and the parallax control value that provides the weakest stereoscopic effect is found for each image. This parallax control value is referred to as "smallest stereoscopic effect parallax control value". The thus found smallest stereoscopic effect parallax control values of the images are compared to each other, and the images to be displayed are sorted in the order of the intensity of the stereoscopic effect from the weakest. Specifically, in the example shown in FIG. 19, it is assumed that the smallest stereoscopic effect parallax control value of the image A is the control value 1-1, the smallest stereoscopic effect parallax control value of the image B is the control value 2, and the smallest stereoscopic effect parallax control value of the image C is the control value 3-1. In this case, if the intensities of the stereoscopic effects of these smallest stereoscopic effect parallax control values are: the control value 3-1<the control value 1-1<the control value 2, the images are sorted in the order of: the image C, the image A and the image B. By selecting the images in this order in step S702 shown in FIG. 17, the images can be displayed in the order of the intensity of the stereoscopic effect from the weakest.

In the flowchart shown in FIG. 17, although the stereoscopic images according to the individual parallax control values of a certain image are displayed first, and then the stereoscopic images of the next image are displayed, this is not intended to limit the invention. For example, the parallax control values of all the images to be displayed may be sorted in the order of the intensity of the stereoscopic effect from the weakest, and the images may be displayed in the order of the stereoscopic effect provided by the parallax control value from the weakest. Specifically, in the example shown in FIG. 19, if intensities of the stereoscopic effects provided by the parallax control values are: the control value 3-1<the control value 1-2<the control value 1-1<the control value 3-2<the control value 2<the control value 1-3, the stereoscopic images may be displayed in the order of: the image C (according to the control value 3-1), the image A (according to the control value 1-2), the image A (according to the control value 1-1), the image C (according to the control value 3-2), the image B (according to the control value 2) and the image A (according to the control value 1-2), in place of displaying the stereoscopic images of each image in the order as shown in FIG. 20.

Although the examples where the display device 50 includes the display monitor 51 are explained in the above-described embodiments, the display device 50 may not necessarily include the display monitor. For example, an external monitor may be connected to the display device 50 via a connection cable, or the like, and the stereoscopic display and the stereoscopic effect control of the image may be performed on the external monitor. Further, even in the configuration where the display device 50 includes the display monitor 51, an external monitor may be connected to the display device 50 via a connection cable, or the like, and the stereoscopic display and the stereoscopic effect control of the image may be performed on the external monitor, in place of the display monitor 51 included in the display device 50.

Although the stereoscopic effect control unit 58 has the function of controlling the stereoscopic effect of the image in the above-described embodiments, the stereoscopic effect control unit 58 in some devices may not necessarily provide the function of controlling the stereoscopic effect. In other words, some stereoscopic image display devices may not have the function of controlling the stereoscopic effect and associating the stereoscopic effect control value with the image to record it in the recording medium. When such a stereoscopic image display device is used to display an image, the stereoscopic image display device may read out a parallax control value that has been controlled with a device having the function of controlling the stereoscopic effect and recorded in the recording medium, and display the multi-viewpoint image with the read out parallax to allow stereoscopic viewing of the image.

Figure 23A:
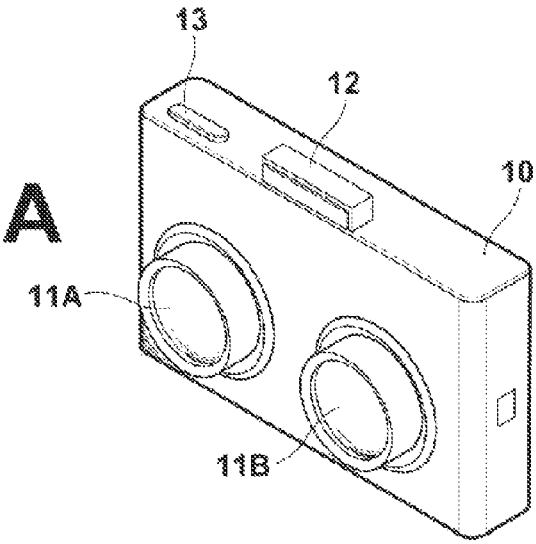
FIG. 23A is a perspective view illustrating the appearance of a stereoscopic imaging device.
Figure 23B:
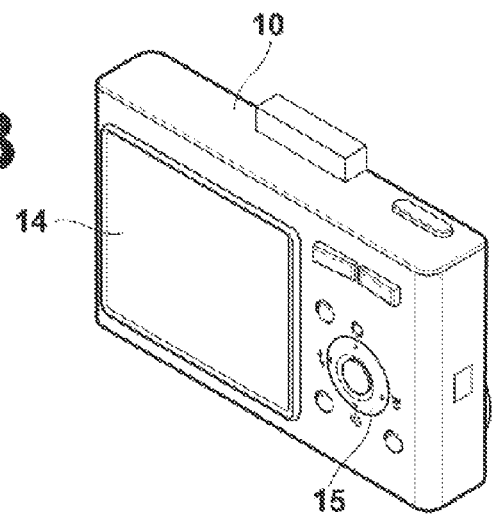
FIG. 23B is a perspective view illustrating the appearance of the stereoscopic imaging device.

Although the stereoscopic effect control and the image display are performed by the stereoscopic image display device in the above-described embodiments, the stereoscopic effect control and the image display may be performed by a stereoscopic imaging device (stereoscopic camera) that captures multi-viewpoint images. FIG. 23A is a perspective view including the front side of a stereoscopic camera 10, and FIG. 23B is a perspective view including the rear side of the stereoscopic camera 10. The stereoscopic camera 10 includes, at the front side thereof, a plurality of lenses 11 (11A, 11B), a flash lamp 12 and a release button 13. The stereoscopic camera 10 also includes, at the rear side thereof, a display monitor 14 and an operation button 15.

The display monitor 14 corresponds to the display monitor 51 of the display device 50 shown in FIG. 1, and the operation button 15 corresponds to the operation button 52 of the display device 50. Although not shown in FIGS. 23A and 23B, the stereoscopic camera 10 may include a communication interface for communication with an external device, and a recording medium slot for receiving a recording medium.

The stereoscopic camera 10 includes n lenses 11 (where n is an integer of 2 or more) for capturing the first to the n-th viewpoint images. In the example shown in FIG. 23A, two lenses are provided (n=2). The lenses 11A and 11B are used to capture the right-eye image and the left-eye image, respectively. A distance between the lens 11P, and the lens 11B is set to be about a distance between the right and left eyes of human beings, for example.

The flash lamp 12 is used to capture images at dark places, or the like. The release button 13 is used by the user (operator) to input an instruction to capture images. When the user presses the release button 13, the stereoscopic camera 10 stores the right-eye image and the left-eye image in a recording medium in the camera or in a recording medium inserted in the recording medium slot. The right-eye image and the left-eye image may be stored as a single file or as separate files.

Figure 24:
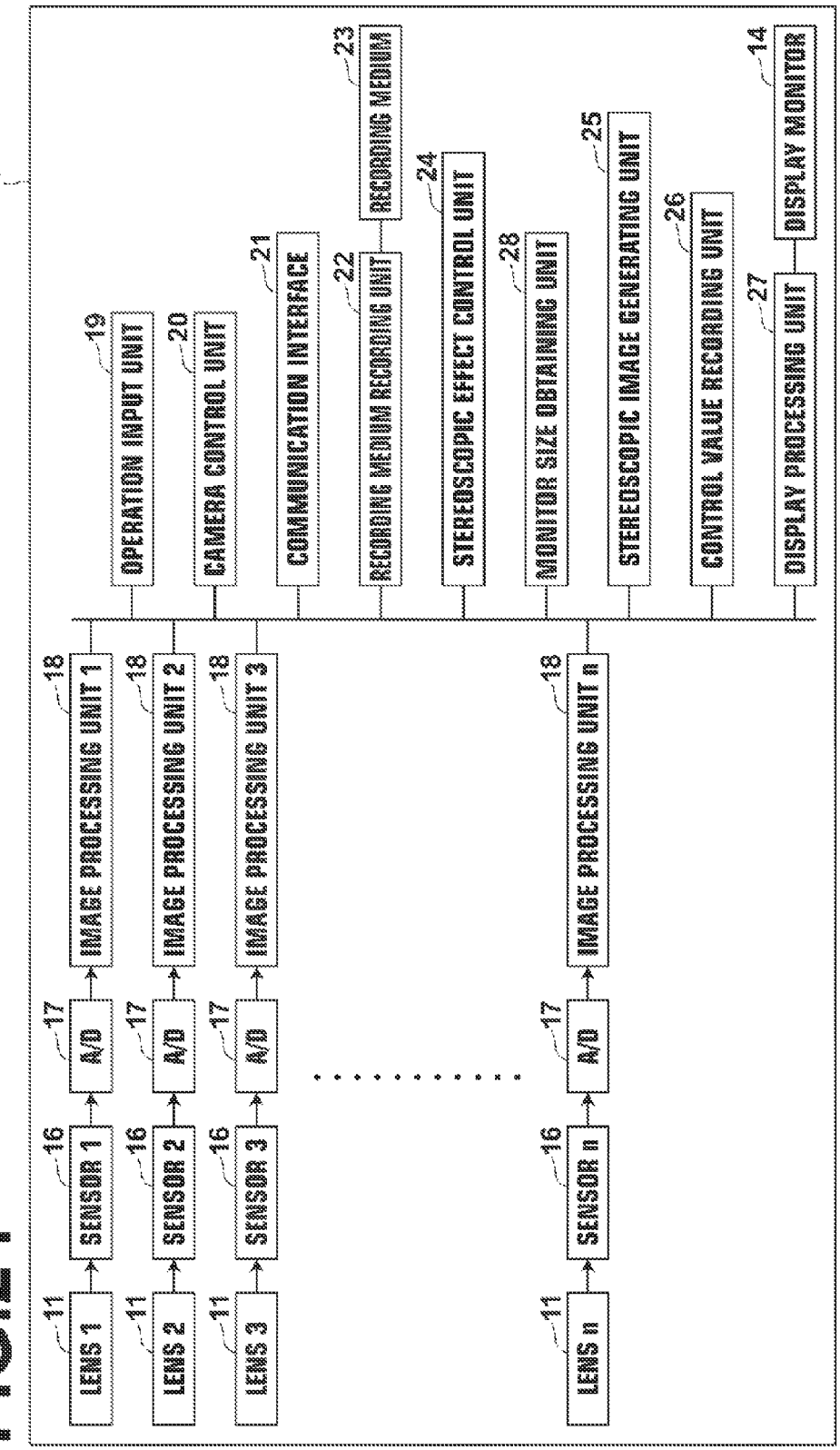
FIG. 24 is a block diagram illustrating internal functions of the stereoscopic imaging device.

FIG. 24 illustrates internal functions of the stereoscopic camera 10. The stereoscopic camera 10 further includes a sensor 16, an A/D converter 17, an image processing unit 18, an operation input unit 19, a camera control unit 20, a communication interface 21, a recording medium recording unit 22, a stereoscopic effect control unit 24, a stereoscopic image generating unit 25, a control value recording unit 26, a display processing unit 27 and a monitor size obtaining unit 28. The operation input unit 19 corresponds to the operation input unit 54 of the display device 50 shown in FIG. 2, and the communication interface 21 corresponds to the communication interface 55. The recording medium recording unit 22, the stereoscopic effect control unit 24, the stereoscopic image generating unit 25, the control value recording unit 26 and the display processing unit 27 correspond to the recording medium recording unit 56, the stereoscopic effect control unit 58, the stereoscopic image generating unit 59, the control value recording unit 60 and the display processing, unit 61, respectively. The configuration of the stereoscopic camera 10 includes the unit for capturing the multi-viewpoint images (the imaging unit) in addition to the configuration of the display device 50.

The lenses 11, the sensor 16, the A/D converter 17, the image processing unit 18 and the camera control unit 20 correspond to the imaging unit that captures the multi-viewpoint images and records the captured images in the recording medium 23. The sensor 16 applies photoelectric conversion to the images focused by the lenses 11. The A/D converter 17 converts an analog signal outputted from the sensor 16 into a digital signal. The image processing unit 18 applies predetermined image processing to the converted digital image signal. The image processing may include, for example, white balance control, tone correction, sharpness correction, color correction, etc. The sensor 16, the A/D converter 17 and the image processing unit 18 are provided correspondingly to each of the lenses 11. The stereoscopic camera 10 generates an image for each of the first to the n-th lenses 11. That is, the first to the n-th viewpoint images are generated.

The camera control unit 20 controls a capturing operation to capture the images. For example, the camera control unit 20 determines capturing timing, controls parameters during capturing, etc. When the user instructs to provide a zoom magnification, for example, the camera control unit 20 drives the lenses 11 to achieve the zoom magnification instructed by the user. The zoom may include not only the optical zoom but also the digital zoom achieved by image processing. In the case of the digital zoom, the camera control unit 20 instructs the image processing unit 18 to provide the zoom magnification, and the image processing unit 18 enlarges a part of the image.

During a photographing operation, a multi-viewpoint image (live-view image) including the first to the n-th images outputted from the image processing unit 18 may be inputted to the stereoscopic image generating unit 25, and the stereoscopic image generating unit 25 may generate a live-view stereoscopic image based on the inputted multi-viewpoint image. The stereoscopic effect control unit 24 may control the stereoscopic effect of the live-view image. In this case, when the user captures and records the multi-viewpoint image in the recording medium, the control value recording unit 26 may record the parallax control value controlled by the stereoscopic effect control unit 24 in the recording medium 23 together with the monitor size of the display monitor 14. The same effect as that provided in the case of the display device 50 is provided in the case of the stereoscopic camera 10 by performing the same operations as those performed by the display device 50, as described above with respect to each embodiment, during the stereoscopic effect control and during the image display.

The present invention has been described based on the preferred embodiments thereof. However, the stereoscopic image display device, the stereoscopic imaging device, the stereoscopic effect control method and the stereoscopic image display method of the invention are not limited to the above-described embodiments, and variation and modifications made to the above-described embodiments are also within the scope of the present invention.

What is claimed is:

1. A stereoscopic image display device comprising:
a stereoscopic image generator that generates, based on a multi-viewpoint image including images captured from multiple viewpoints, a stereoscopic image for stereoscopically displaying an image;
a display processor that displays the stereoscopic image on a display monitor capable of stereoscopic display;
a stereoscopic effect controller that sets a stereoscopic effect control value for the stereoscopic image generator to control a stereoscopic effect of the stereoscopic image displayed on the display monitor;
a control value recorder that associates the stereoscopic effect control value set by the stereoscopic effect controller and a monitor size of the display monitor used to display the stereoscopic image when the stereoscopic effect is controlled with the multi-viewpoint image and records the stereoscopic effect control value and the monitor size in a recording medium; and
a monitor size obtainer that obtains the monitor size of the display monitor,
wherein, at the time of image display, the stereoscopic effect controller reads out, from the recording medium, the recorded stereoscopic effect control value associated with the multi-viewpoint image to be displayed and corresponding to the monitor size obtained by the monitor size obtainer, and set the read out stereoscopic effect control value for the stereoscopic image generator and
wherein, if there is no stereoscopic effect control value corresponding to the monitor size obtained by the monitor size obtainer, the stereoscopic effect controller reads out, from the recording medium, a stereoscopic effect control value corresponding to a monitor size closest to the obtained monitor size.

2. A stereoscopic image display device comprising:
a stereoscopic image generator that generates, based on a multi-viewpoint image including images captured from multiple viewpoints, a stereoscopic image for stereoscopically displaying an image;
a display processor that display the stereoscopic image on a display monitor capable of stereoscopic display;
a stereoscopic effect controller that sets a stereoscopic effect control value for the stereoscopic image generator to control a stereoscopic effect of the stereoscopic image displayed on the display monitor;
a control value recorder that associates the stereoscopic effect control value set by the stereoscopic effect controller and a monitor size of the display monitor used to display the stereoscopic image when the stereoscopic effect is controlled with the multi-viewpoint image and records the stereoscopic effect control value and the monitor size in a recording medium; and
a monitor size obtainer that obtains the monitor size of the display monitor,
wherein, at the time of image display, the stereoscopic effect controller reads out, from the recording medium, the recorded stereoscopic effect control value associated with the multi-viewpoint image to be displayed and corresponding to the monitor size obtained by the monitor size obtainer, and set the read out stereoscopic effect control value for the stereoscopic image generator,
and the stereoscopic image display device further comprising a displayed image selector that selects an image to be displayed from multi-viewpoint images recorded in a recording medium,
wherein the stereoscopic effect controller reads out one or more recorded stereoscopic effect control values associated with the multi-viewpoint image selected as the image to be displayed, and sets each of the read out one or more stereoscopic effect control values for the stereoscopic image generator,
the stereoscopic image generator generates one or more stereoscopic images with one or more stereoscopic effects represented by the set one or more stereoscopic effect control values based on the multi-viewpoint image selected as the image to be displayed, and
the display processor sequentially displays the one or more stereoscopic images generated by the stereoscopic image generator on the display monitor,
and wherein the display processor displays the stereoscopic images in an order of an intensity of the stereoscopic effect from the weakest.

3. The stereoscopic image display device as claimed in claim 2, wherein the displayed image selector selects a plurality of multi-viewpoint images as images to be displayed, and
if a plurality of stereoscopic effect control values are associated with one multi-viewpoint image, the display processor sequentially displays stereoscopic images generated according to the stereoscopic effect control values associated with the one multi-viewpoint image, and then, displays a stereoscopic image of a next multi-viewpoint image.

4. The stereoscopic image display device as claimed in claim 2, wherein the displayed image selector selects a plurality of multi-viewpoint images as images to be displayed, and
the display processor sequentially displays a plurality of stereoscopic images generated according to i-th stereoscopic effect control values of the multi-viewpoint images, where i is from 1 to a number of the stereoscopic effect control values, based on the multi-viewpoint images selected as the image to be displayed, and then, displays stereoscopic images generated according to i+1th stereoscopic effect control values of the multi-viewpoint images.

5. A stereoscopic image display device comprising:
a stereoscopic image generator that reads out a multi-viewpoint image to be displayed from a recording medium and generates a stereoscopic image for stereoscopically displaying an image based on the read out multi-viewpoint image, the recording medium storing a multi-viewpoint image including images captured from multiple viewpoints, one or more stereoscopic effect control values for controlling a stereoscopic effect when the multi-viewpoint image is stereoscopically displayed, the stereoscopic effect control values being associated with the multi-viewpoint image, and a monitor size of a display monitor used when the stereoscopic effect control value is controlled, the monitor size being associated with each stereoscopic effect control value;
a monitor size obtainer that obtains a monitor size of a display monitor capable of stereoscopic display of the stereoscopic image;
a stereoscopic effect controller that reads out a stereoscopic effect control value associated with the monitor size obtained by the monitor size obtainer from one or more stereoscopic effect control values associated with the multi-viewpoint image to be displayed and recorded in the recording medium, and sets the read out stereoscopic effect control value for the stereoscopic image generator; and a display processor that displays the stereoscopic image generated by the stereoscopic image generator on the display monitor and wherein, if there is no stereoscopic effect control value corresponding to the monitor size obtained by the monitor size obtainer, the stereoscopic effect controller reads out, from the recording medium, a stereoscopic effect control value corresponding to a monitor size closest to the obtained monitor size.

6. The stereoscopic image display device as claimed in claim 1, further comprising a displayed image selector that selects an image to be displayed from multi-viewpoint images recorded in a recording medium, wherein the stereoscopic effect controller reads out one or more recorded stereoscopic effect control values associated with the multi-viewpoint image selected as the image to be displayed, and sets each of the read out one or more stereoscopic effect control values for the stereoscopic image generator, the stereoscopic image generator generates one or more stereoscopic images with one or more stereoscopic effects represented by the set one or more stereoscopic effect control values based on the multi-viewpoint image selected as the image to be displayed, and the display processor sequentially displays the one or more stereoscopic images generated by the stereoscopic image generator on the display monitor.

\* \* \* \* \*